(12) United States Patent
Jaeger et al.

(10) Patent No.: US 7,084,860 B1
(45) Date of Patent: Aug. 1, 2006

(54) METHOD AND APPARATUS FOR A TOUCH SENSITIVE SYSTEM EMPLOYING DIRECT SEQUENCE SPREAD SPECTRUM (DSSS) TECHNOLOGY

(75) Inventors: Denny Jaeger, Oakland, CA (US); Andrew Lohbihler, North York (CA)

(73) Assignee: Intertact Corporation, Oakland, CA (US)

( * ) Notice: Subject to any disclaimer, the term of this patent is extended or adjusted under 35 U.S.C. 154(b) by 395 days.

(21) Appl. No.: 10/207,716

(22) Filed: Jul. 25, 2002

Related U.S. Application Data

(63) Continuation-in-part of application No. 09/877,611, filed on Jun. 8, 2001.

(51) Int. Cl.
*G09G 5/00* (2006.01)

(52) U.S. Cl. ............... 345/173; 345/179; 178/18.01; 178/18.07; 178/19.01; 178/19.03; 178/20.01

(58) Field of Classification Search ............ 345/173, 345/179; 178/18.01; 341/15, 22, 29
See application file for complete search history.

(56) References Cited

U.S. PATENT DOCUMENTS

| | | | |
|---|---|---|---|
| 4,213,005 A * | 7/1980 | Cameron | 178/18.07 |
| 4,786,765 A * | 11/1988 | Yamanami et al. | 178/19.06 |
| 4,902,858 A * | 2/1990 | Yamanami et al. | 178/18.07 |
| 5,138,118 A * | 8/1992 | Russell | 178/19.03 |
| 5,231,381 A * | 7/1993 | Duwaer | 345/174 |
| 5,341,155 A * | 8/1994 | Elrod et al. | 345/179 |
| 5,729,251 A * | 3/1998 | Nakashima | 709/250 |
| 5,784,060 A * | 7/1998 | Bertram et al. | 715/840 |
| 5,792,997 A * | 8/1998 | Fukuzaki | 178/18.07 |
| 5,793,361 A * | 8/1998 | Kahn et al. | 345/179 |
| 5,963,199 A * | 10/1999 | Kato et al. | 345/179 |
| 6,002,387 A * | 12/1999 | Ronkka et al. | 345/157 |
| 6,005,555 A * | 12/1999 | Katsurahira et al. | 345/174 |

* cited by examiner

*Primary Examiner*—Henry N. Tran
(74) *Attorney, Agent, or Firm*—Harris Zimmerman

(57) ABSTRACT

A touch sensing apparatus for receiving input from one or more touch stimulating devices employs a direct sequence spread spectrum (DSSS) signaling arrangement to transmit signals from the touch stimulating devices for identification and location determination. Active devices are powered by an EM field and generate a touch stimulating signal that is spread spectrum encoded for identification, and signal pick-ups in a propagation layer receive the touch stimulation signals which are identified by the DSSS encoding and located using received signal strength (RSS) techniques. Semi-active devices are powered by an EM field and receive code instructions to generate specific spread spectrum signals and generate a touch-stimulating signal. Touch stimulating devices are either tethered or tether-free, and powered by batteries or EM fields.

58 Claims, 24 Drawing Sheets

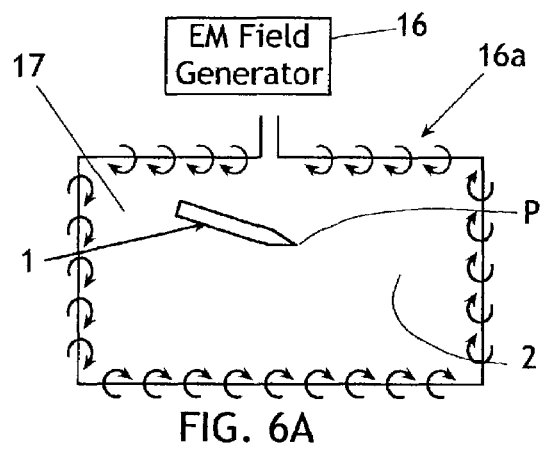
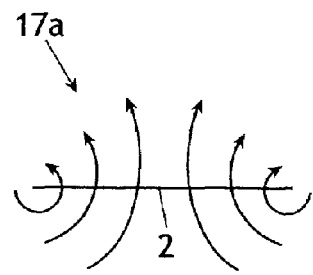
FIG. 6A
FIG. 6B
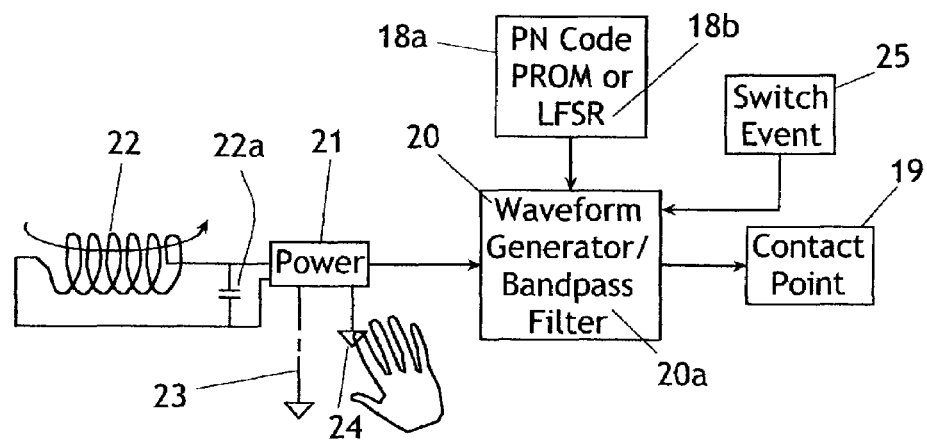
FIG. 6C $$x(t) = \frac{(V_2+V_3)-(V_1+V_4)}{V_1+V_2+V_3+V_4} \qquad y(t) = \frac{(V_1+V_2)-(V_3+V_4)}{V_1+V_2+V_3+V_4}$$

$$x_c = R_x \frac{(x-x_L)}{(x_u-x_L)}$$

$$y_c = R_y \frac{(y-y_L)}{(y_u-y_L)}$$

$x_c, y_c$    corrected position coordinate
$x, y$    coordinates calculated by CDMA processor
$x_L, y_L$    lower calibration point (exact)
$x_u, y_u$    upper calibration point (exact)
$R_x, R_y$    x,y axis resolution

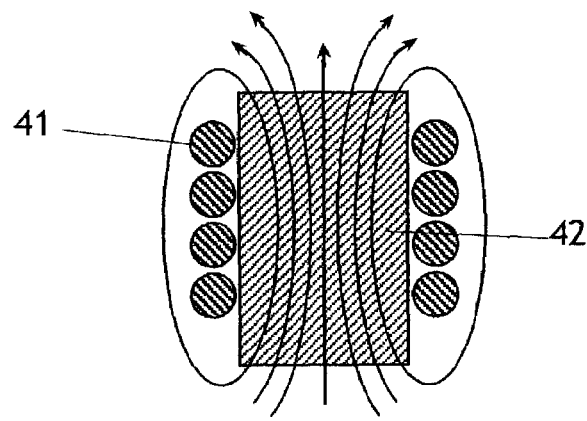
FIG. 21
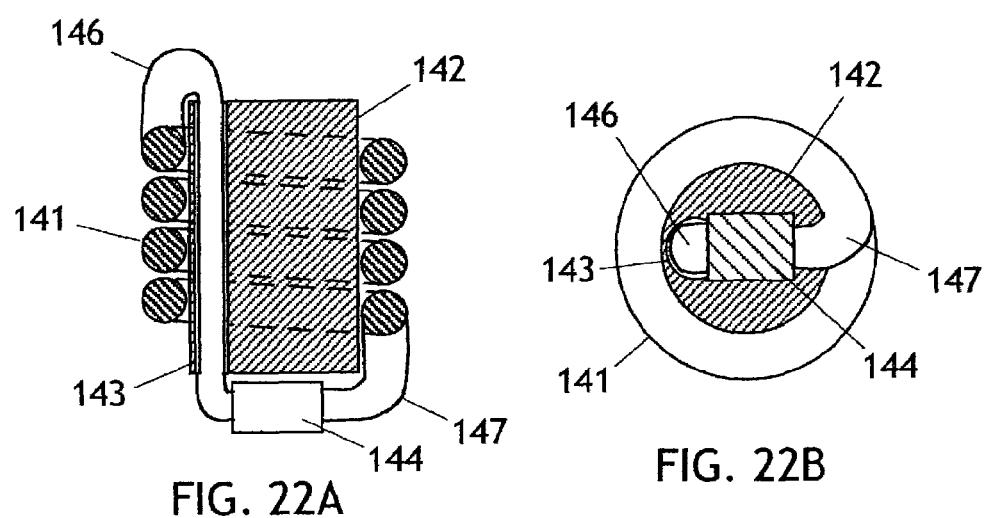
FIG. 22A
FIG. 22B
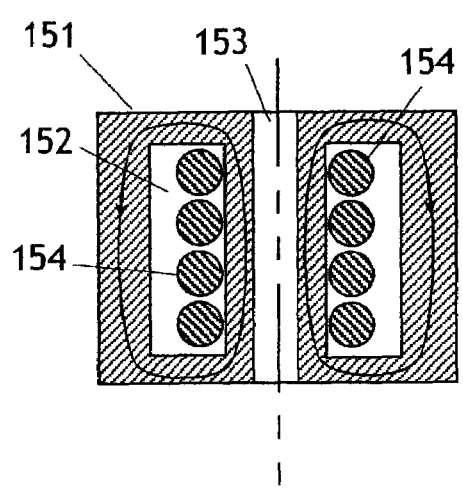
FIG. 23
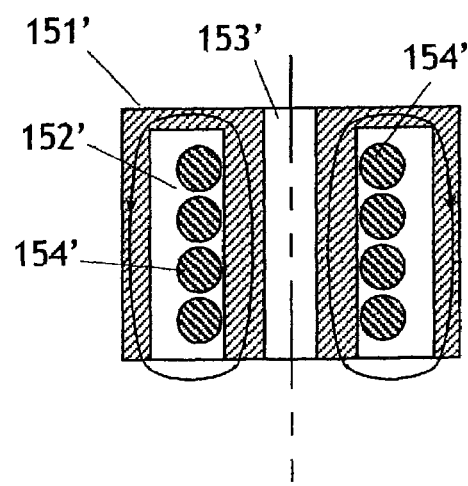
FIG. 24

METHOD AND APPARATUS FOR A TOUCH SENSITIVE SYSTEM EMPLOYING DIRECT SEQUENCE SPREAD SPECTRUM (DSSS) TECHNOLOGY

REFERENCE TO RELATED APPLICATION

This application is a continuation-in-part of application Ser. No. 09/877,611, filed Jun. 8, 2001, for which priority is claimed.

BACKGROUND OF THE INVENTION

This invention relates to an apparatus and method employing Spread Spectrum (SS) signal structures for the operation of one or more touch-input devices on a touch-sensing system.

A touch system consists of two parts, namely one or more touch-input devices and a touch-sensing architecture. These two parts themselves can consist of hardware and/or software structures to realize their functionality.

In this document, a touch-sensing tablet (termed touch screen hereafter) can be regarded as a touch screen, a digitizer, a writing panel, a modified mouse pad, or the like. A touch-input device can be regarded as a stylus, a pen, a rotary knob, a mouse, a slider (fader), and the like. The system operation is defined as, but not limited to, one or any possible combination of the following functionalities, namely a touch screen (or its equivalent) that identifies, tracks, or communicates with one or more touch-input devices.

Touch screen technologies known in the prior art are most easily differentiated according to their system infrastructures. They are traditionally classified into resistive, or pressure sensing; capacitive; surface acoustic wave; ultrasound; and electromagnetic (EM) wave systems. The touch screen technologies of concern here are capacitive and direct-contact touch screens which only involve a form of electrical contact with the touch surface.

In capacitive systems, the screen assembly includes a sensing layer that is capable of storing electrical charges. Electrical sensors located at the boundaries of the touch screen apply an electrical field that is distributed across the touch screen surface, forming, in effect, a distributed capacitor. In a passive touch, a human finger or a conductive device touches the screen and draws a current from the sensors. The differential in the current flows in the boundary sensors corresponds to the position of the touch on the screen. For this reason, passive capacitive touch screens do not work well, if at all, when used with a non-conductive device, such as a gloved hand or an inert stylus. In an active capacitive system, an active device emits an excitation signal at the touch point, injecting current into the sensors, and the current is measured to determine the touch position. Active capacitive systems usually have an improved touch resolution over passive systems, due to the fact that an active device provides an improved Signal-to-Noise Ratio (SNR) compared to passive systems. Capacitive systems are very durable, with high screen clarity.

In direct-contact touch systems, the screen assembly includes a sensing layer that is an open conductive contact surface. Examples of this surface are a resistive Indium Tin Oxide (ITO), Tin Oxide (TO), or any other resistive non-transparent surface. Electrical sensors located at the boundaries of the touch screen are sensitive to electrical energy coming in contact with the surface thereby applying a signal received at each of the sensors. The surface is initially at ground potential and an electrically charged stylus supplies current is drawn from the stylus to the contact surface. The differential in the voltage levels in the boundary sensors corresponds to the position of the touch on the screen. Similar to capacitive, direct-contact touch screens do not work well, if at all, when used with a non-conductive device, such as an inert stylus. In an active direct-contact system, an active device emits an excitation signal at the touch point, injecting a signal into the sensors, and the signal amplitude is measured to determine the touch position. Active direct-contact systems also have a high touch resolution, and are very durable, with high screen clarity. A direct-contact system can operate with low active voltages allowing methods for self-powering with EM fields (i.e. battery-free), and tether-free stylus operation (i.e. no ground cable).

In the prior art, the number of touch-input devices allowed in a touch system is generally limited to one. However, in U.S. Pat. Nos. 6,005,555, 6,020,849, and other similar patents, methods of operating multiple touch-input devices are addressed, with each device designed to work on single or multiple narrowband channels.

Concerning information encoding, U.S. Pat. No. 5,247,138 describes a cordless digitizer stylus that transmits encoded signal to a touch-sensing tablet. This signal contains information bits relating to the touch-input device such as on-off status of the switches, position of the device, etc. These information bits are coded by a binary code at a particular frequency, and the information carrying signal disclosed is a narrowband signal.

In U.S. Pat. No. 6,005,555, a touch system with two carrier frequencies $f_0$ and $f_1$ is disclosed. Information bits of the system are commands from the touch-sensing tablet to the touch-input devices and data bits from the devices to the tablet. The system signal spectrum consists of two discrete information spectra, centered at two carrier frequencies $f_0$ and $f_1$. No signal with bandwidth wider than the information bandwidth is used. Similar disclosures can be found in other patents regarding touch screens.

In U.S. patent application Ser. No. 09/877,611 the concept of CDMA signaling is used to describe how a plurality of devices can be simultaneously used on a touch screen surface, allowing all devices to be separately locatable. This disclosure discusses the use of CDMA applied to capacitive and direct-contact touch systems (and other touch systems such as acoustic, ultrasonic surface wave, EM, etc.) where a plurality of electrical contact devices are locatable on a touch surface.

It should be emphasized that touch systems of the prior art, including the above mentioned patents, are regarded as narrowband systems. That is, these systems have their signal bandwidth at no wider than the information bandwidth, as shown in FIG. 1A. There is no wideband encoding for the system information bits or carriers in these patent disclosures.

In summary, the signal spectra of the above mentioned narrowband systems are the combination of the discrete information spectra at individual carrier frequencies. Their signal energy is confined within these discrete information spectra. No extra bandwidth other than the information spectra is occupied. These narrowband systems are significantly different from wideband systems, namely spread spectrum (SS) systems, of this invention.

SUMMARY OF THE INVENTION

The invention generally comprises a method and apparatus for a touch system employing SS signal structure for the use of one or more touch-input devices on a touch-sensing surface. The invention permits the touch system to be able to simultaneously identify, track, communicate with, etc., one or a plurality of touch-input devices. This section is organized as follows: Section 3.1 gives some basic concepts and terminology, as well as the associated advantages of the SS touch system used in this invention; Section 3.2 defines and discuses the specific SS signals used by this invention; Section 3.3 addresses some important system designing aspects of how to implement the SS touch systems this invention. Section 3.4 gives the whole SS touch system configuration.

3.1 Spread Spectrum Touch Systems

In this invention, a signal is defined to be the electronic records, e.g., a sequence of time domain amplitudes of the vibration of an energy field. In a touch system of this invention one or more information embedded energy field(s) may be used as the physical carrier(s) for transmitting (TX) and receiving (RX) the system information. These activities are carried out and confined within one or more communication channels, for which the spectra are allocated beforehand by system design and characterized by their bandwidths and spectral locations. A touch system may have multiple concurrent communication channels, assigned at different spectral locations without overlapping.

In a touch system, concerning one communication channel, information spectrum and signal spectrum are defined as the spectral allocations for the information and the vibration of the energy field, respectively. Therefore, the following relationship can be established:

$$BW_{Info} \leq BW_{Sig} \leq BW_{Ch}$$

where $BW_{Info}$, $BW_{Sig}$, and $BW_{Ch}$, are the bandwidths of information, signal, and communication channel, respectively. In this invention, a system is called wideband if it has at least one communication channel such that the signal bandwidth is wider than the information bandwidth, as seen from the FIG. 11B. It is well known in the art that this system is also called a SS system, in the sense that at this channel the information spectrum is spread to a signal spectrum with wider bandwidth. This process of spectral spreading is accomplished by, e.g., coding the information bits or the carrier frequency with one or more wideband codes having continuous bandwidths. The inverse of this procedure is usually called de-spreading (matched-filtering or correlating).

In a touch system of this invention the spreading is done at the transmission end using wideband code(s), so the signal used for transmission is a wideband signal. At the reception end, this wideband signal is de-spread with the same code(s) to get the information bits back.

There are two major advantages of using SS for touch systems in this invention, namely to improve SNR and to allow channelization with a plurality of touch devices.

3.1.1 SNR Improvement

It is well known that in a SS system, when the information bandwidth is evenly spread, the system Processing Gain (PG) can be expressed as:

$$PG(dB) = 10\log 10\left(\frac{BW_{Sig}}{BW_{Info}}\right). \quad (2)$$

Having the PG, the SNR of the SS system can be improved to $$SNR_{SS} = PG + SNR_{Sig}, \quad (3)$$

where $SNR_{SS}$ and $SNR_{Sig}$ are the SNRs of a SS touch system and the transmitted signal respectively.

With improved SNR, SS systems in this invention can be designed in ways that are very different from narrow band touch systems. The benefits of having improved SNR in a SS system include:

1. SS systems can have higher noise immunity.
2. Touch-input devices can be cost-effectively designed to have balanced noise immunity through spreading.
3. Signals can be transmitted with less energy.
4. Signals can propagate for longer distance.
5. The power consumption of each touch-input device can be greatly reduced so that various power supply methods can be used.
6. Higher touch resolution can be easily achieved.

For example, for a SS system with $SNR_{Sig}=-10$ dB (signal energy is 10-times less than noise) and $PG=30$ dB (signal bandwidth is 1000-times wider than information bandwidth), its $SNR_{SS}=20$ dB. That is to say, with a properly designed PG, the SS system can pick up information from signals below noise. A narrowband system can not work on an environment that has negative SNR, unless some additional signal processing methods, e.g. signal averaging, are used.

3.2. Spread Spectrum Signals

In this invention, SS signals structures are based on time-domain spreading methods only. These methods include Direct Sequence Spread Spectrum (DSSS) signals, Time Hopping Spread Spectrum (THSS) signals, Hybrid methods of DSSS and THSS, and the like.

3.2.1 DSSS Signals

In this invention, a DSSS signal is generated by encoding the system information bits with one or more wideband codes, which occupy a given bandwidth. (These codes are called Direct Sequence (DS) codes.) By generating a signal in this way, the resulting signal bandwidth is the sum of the information bandwidth plus the bandwidth of the DS code. FIGS. 1A–1B are simple illustrations of DSSS signals and how they spread in the time and frequency domain.

One important and frequently used DS code is the Code Division Multiple Assess (CDMA) code. This invention allows one or a plurality of devices to be simultaneously operated within one channel. One way of doing this is to assign each device with a unique CDMA code, which is orthogonal to CDMA codes used by other devices.

The orthogonality of CDMA codes enables the information bits of one device to be easily distinguished from information bits of other devices, by matched-filtering the received signal with the individual CDMA code of each device. This matching procedure is analogous to identifying a person as being distinctly different from other persons according to the uniqueness of his (her) fingerprint or picture.

DSSS techniques employ a pseudo-random (PN) code word known to the transmitter and to the receiver to spread the data and to make it more difficult to detect by receivers lacking the code word. The code word consists of a sequence of "chips" having values of −1 or +1 (polar) or 0 and 1 (non-polar) that are multiplied by (or Exclusive-OR'ed with) the information bits to be transmitted. Accordingly, a logic "0" information bit may be encoded as a non-inverted code word sequence, and a logic "1" information bit may be encoded as an inverted code word sequence. Alternatively, a logic "0" information bit may be encoded as a first predetermined code word sequence and a logic "1" information bit may be encoded as a second predetermined code word sequence. There are numerous well-known codes, including M-sequences, Barker codes, Walsh codes, Gold codes and Kasami codes. FIG. 1A illustrates the data encoding with a short 7-bit PN code as an example.

3.3. System Design Aspects

In this section some important implementation aspects of system design are addressed, which include the following issues:
1. Energy fields that carry the physical SS signals.
2. The mediums in which the energy field is propagating.
3. The active and semi-active ways that a touch-input device generates its SS signal.
4. Identification of a plurality of touch-input devices.
5. Simultaneously locating and tracking a plurality of touch-input devices.
6. Communicating between touch-input devices and the CDMA processing unit.
7. Power supply methods for the touch-input devices.

3.3.1 EM Wave Energy Field

An EM wave energy field is defined for this invention as a wave-propagating field that physically carries energy to power-on transmitting devices that will send DSSS coded signals when in electrical contact with the touch screen. A Radio Frequency (RF) wave field is generated by an EM field at a constant radio frequency to drive a powering circuit in the device to inductively absorb electrical energy and power a code transmitter. The invention also provides an antenna arrangement that transmits the EM field across the touch screen with sufficient uniformity to provide a reliable powering system for the touch input devices.

In this invention a touch system may also use the energy field to implement a communication link as part of the system's operation. For example, a touch system may use the EM wave field to send an RF signal to communicate with one or a plurality of touch devices.

3.3.2. Wave Propagating Medium

In this invention different types of materials may be used as the propagation mediums of the EM energy fields and for the electrical contact touch surface. For the EM powering field, the RF signal can propagate through space or through a resistive layer coated on a touch-sensing plane to do the same. For the electrical contact of devices, a resistive surface is required that is coated for capacitive contact or an open contact area for direct-contact of a plurality of device contact points. Note: A capacitive "contact" is not an electrical "connection" in the strict sense because the original device current and the sensed current are not the same, as it is in a direct electrical flow. However, capacitive "touch" causes electrical charge to build up and flow so it can still be called a "contact." In either direct contact or capacitive contact, the device causes current to flow at a well-defined point on the touch-sensing plane.

3.3.3 Active or Semi-Active Touch-Input Devices

A touch-input device is classified in this invention as an active device if it generates the DSSS signals by itself to a touch-sensing tablet or plane. A touch-input device is classified in this invention as a semi-active device if it conveys a DSSS signal through an EM field radio link to a touch-sensing tablet or plane.

In this invention, system operation may be implemented using either active or semi-active touch-input devices, depending on the practical system design considerations. For example, if the tracking accuracy and the system capacity (the number of simultaneous touch-input devices allowed) are of great importance, then active devices are a good choice. If the cost and simplicity of the touch-input devices are of great importance, then semi-active devices should be considered. For example, semi-active touch-input devices may have a code communicated through the EM field radio link to assign and separate them from other touch-input devices. This may be necessary to synchronize code signals to fixed DSSS time offsets allowing better identification and accurate location tracking of touch-input devices.

3.3.4 Identification Models

When a touch system is designed to have only one touch-input device, the presence of that touch-input device can be easily identified from the its RSS, either in an active or a passive way.

When a plurality of touch-input devices is concerned, the CDMA (Code-Division Multiple-Access) method of multiple device access is used to identify different devices. The CDMA method allows multiple access to be performed within the same communication channel by pre-assigning each touch-input device a unique CDMA code.

3.3.5 Location Tracking

The Location Tracking model in this invention to position the touch-input device(s) using the received signal strength (RSS) or amplitude of signals received by receiving sensors on the touch screen. This method will be referred to as the RSS model.

The RSS model used in this invention is the planar propagating model. That is, when a wave field is confined to propagating through a electrical conducting plane, such as a resistive layer on a touch screen surface through which an EM signal propagates, the associated RSS is then modeled to be linearly proportional to the inverse of R, which is:

$$RSS \propto \frac{1}{R}. \quad (7)$$

where R is the distance between a touch-input device and a receiver sensor.

Using this principle, when more than one receiver is used, a touch-input device can then be tracked. To obtain the required RSS estimation of a touch-input device, in this invention the following steps are performed:
1. Use the DSSS code (e.g., CDMA code) of input device to matched-filter the received signal;
2. Obtain the peak of the matched-filtering output function, namely the RSS, from one information bit. If needed, use an interpolation procedure to find the peak at a higher resolution;
3. Use an averaging procedure by combining the RSSs from different information bits if a higher resolution is desired. An example is to sum the area of the correlation triangle as a weighted average;
4. Use the result from step 3 as the RSS estimation of this device.

Experimental models (sometimes called calibration models) are established in this invention by taking RSS measurements, while using the RSS model, is optional. One way of establishing an experimental model is to set up a number of calibration points on the surface of a touch-sensing tablet or plane, and take time-delay and/or RSS measurements at these points. A matrix of experimental positioning data can then be established, and touch location resolution can be obtained and/or improved by interpolation using this data.

3.3.6 Communication Models

Communication models in this invention are similar to common DSSS communication systems known in the prior art. To perform communication procedures, after despreading, a bit decision is made based on the sign of the despreading correlation peak output for a particular touch-input device. If a touch-input device utilizes a switch to convey information (such as a pen using a "right-click") then the device will encode a data bit using "bit-inversion-modulation." That is, CDMA code will be inverted for one "bit-period" (see FIG. 1). If more than one data event is conveyed by the touch-input device then multiple CDMA codes can be assigned for transmitting additional data information.

3.3.7 Power Supply for the Device

In this invention, two different types of methods to supply power for the active touch-input devices have been developed, which include: 1) using a chemical battery; and 2) using an EM powering field in free space with a loop antenna and powering circuit in the active device.

Details about the methods 2) can be found in a co-pending patent application Ser. No. 09/877,611 addressing these issues It must be noted that, due to the fact that in this invention DSSS signals are used, an active touch-input device requires much less power than an active device in a narrow band system. This enables the above power supply methods to be more practical.

3.4 System Configuration

In this invention there are two major components to a touch system according to the system design considerations: a hardware platform that physically implements the touch system, and a software structure that performs the system operational functions when data is obtained.

3.4.1 Hardware Platform

The hardware platform of a touch system in this invention can include the configuration of: 1) One or both of a free-space EM energy field or an EM capacitive field; 2) The sensors that pickup the electrical signals from the electrical contact plane; 3) The active and/or semi-active devices to introduce the touch-input events; 4) The powering/modulation unit to act as the transmission device in the EM communication channel; 5) the CDMA Detector and Processing Unit to perform the signal processing needs based on the CDMA system model; 6) the X-Y Locator and Data Signal Processing Unit to perform the data processing procedures such as device location, device data switching, calibration, data formatting, bit packaging, etc; 7) the Micro-Controller Unit (MCU) to control the overall system operation and the communication with the master PC of the touch screen. FIG. 4 shows the typical hardware configuration of a touch system.

3.4.2 Software Structure

Regarding the building of the software structure, a touch system in this invention includes programs designed: 1) to generate the DSSS signals based on the DSSS code selected; 2) to process the received signals based a pre-defined system operation model, so that the touch-input devices can be identified, tracked, and communicated with; 3) to perform the data processing procedures, such as calibration, data formatting, bit packaging, etc; 4) to perform system control activities.

BRIEF DESCRIPTION OF THE DRAWINGS

FIGS. 6A, 6B, depict, respectively, a schematic top view and side view of an EM powering circuit; FIG. 6C depicts a self-powered touch-input device with a tethered ground connection or a tether-free human-ground connection.

FIG. 21 is a schematic cross-section of a ferrite antenna assembly of the invention.

FIGS. 22A and 22B are a cross-sectional elevation and an end view of one embodiment of the ferrite antenna assembly of the invention.

FIG. 23 is a cross-sectional elevation of another embodiment of the ferrite antenna assembly.

FIG. 24 is a cross-sectional elevation of a further embodiment of the ferrite antenna assembly.

DESCRIPTION OF THE PREFERRED EMBODIMENT

Figure 4:
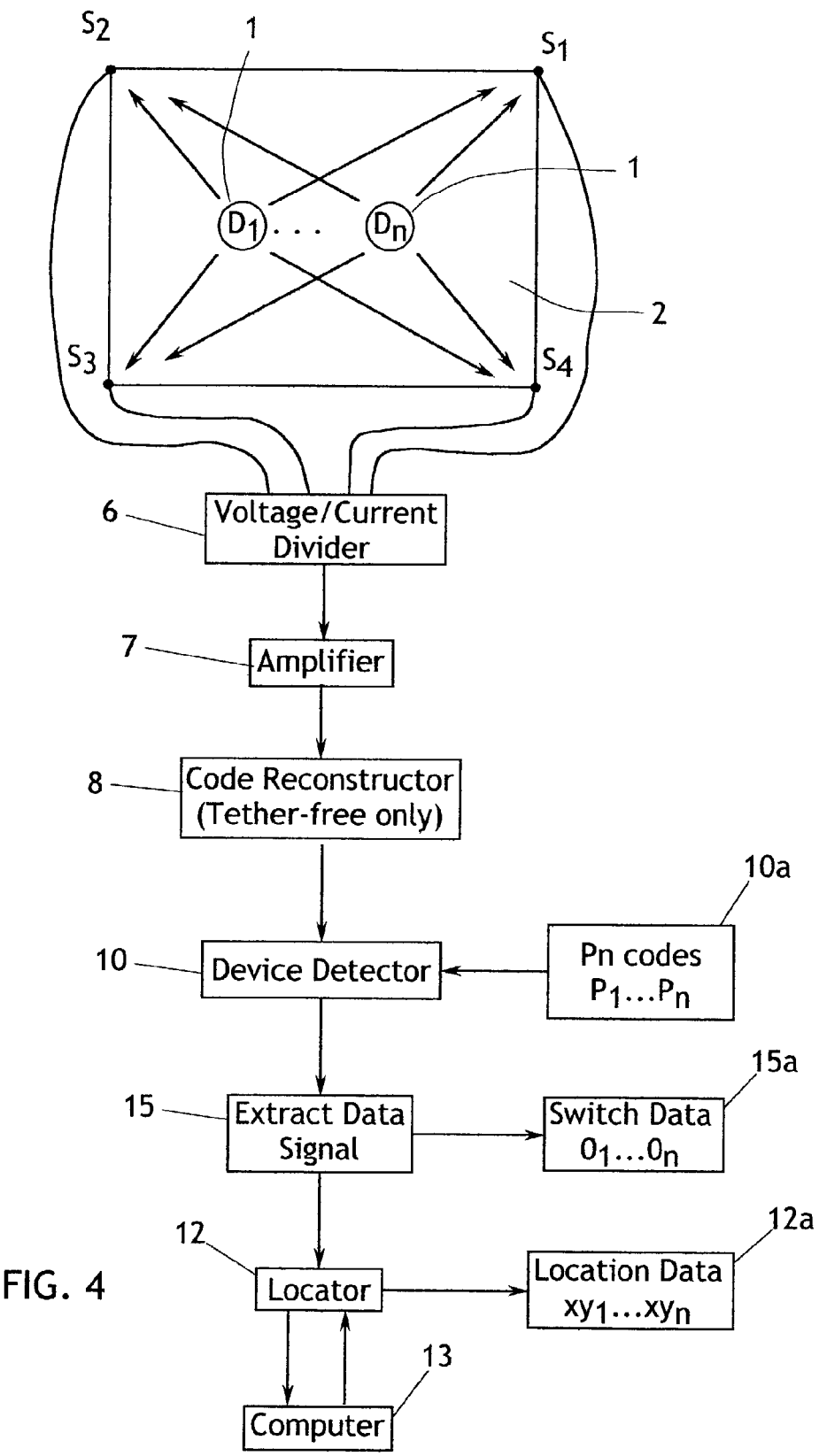
FIG. 4 depicts the multiple device detection system method for locating multiple touch-input devices and extracting data signals from said devices.

The present invention generally comprises an apparatus and method employing Spread Spectrum (SS) signal structures for the operation of one or more touch-input devices on a touch-sensing system. In one embodiment of this invention a touch screen for multiple active or semi-active touch-input devices with CDMA DSSS signal structure is discussed. The fundamental hardware function blocks of an active touch-input device are illustrated in FIG. 4. This embodiment generally comprises a method and apparatus for tracking one or more active touch-input devices on a touch sensitive surface (direct electrical contact or capacitive), using the spread spectrum signal structure incorporating CDMA DSSS codes. Such touch-input devices may include a pen or stylus, knob, slider (fader), joystick, mouse, or its equivalent.

The apparatus of the invention includes at least one, and typically a plurality of active touch-input devices $(D_1-D_n)$ 1, each applying touch stimulating input to a sensing surface 2, and stimulating a plurality of electrical sensors $S_1-S_4$, connected at spaced apart locations at the periphery of the sensing surface, as shown in FIG. 4. With regard to FIGS. 6A–6C, there is a EM signal generator unit 16 to provide an EM signal to EM field coil 16a at the same resonant frequency as a power coil 22 provided in each touch-input device 1. EM energy from generator 16 is radiated from coil 16a and induced by the touch device power coil 22 of each device 1, the induced current being regulated by the device power circuit 21.

Figure 6D:
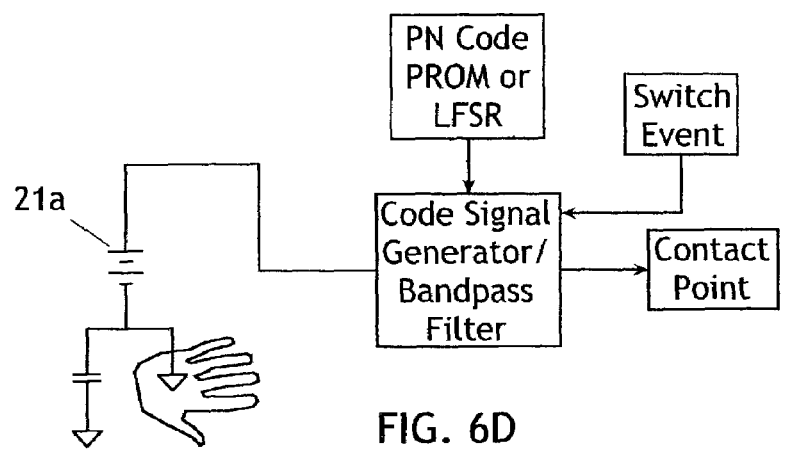
FIG. 6D depicts a battery powered touch-input device.
Figure 6E:
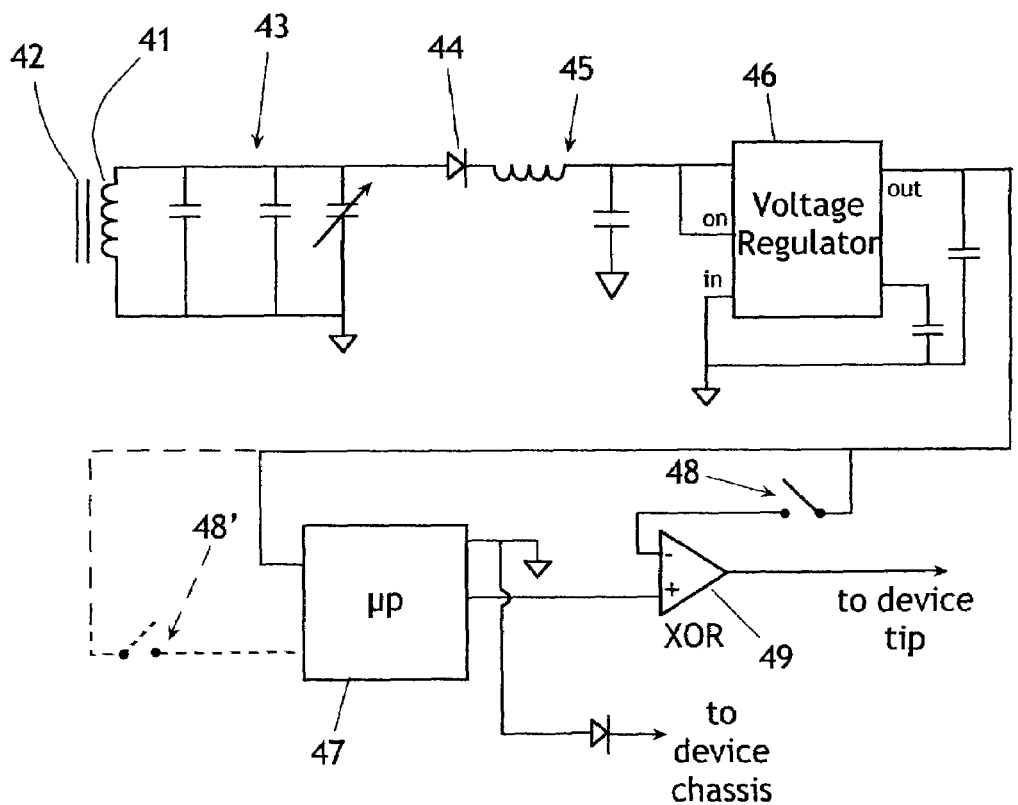
FIG. 6E is a schematic of one embodiment of a device circuit.
Figure 6F:
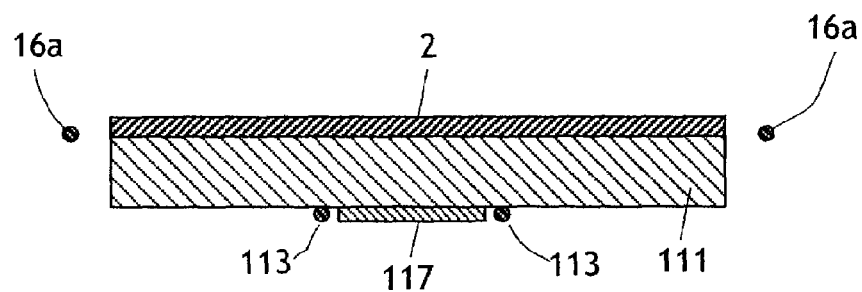
FIG. 6F is a cross-sectional elevation of a two antenna EM field transmitter combined with a flat panel display.
Figure 6G:
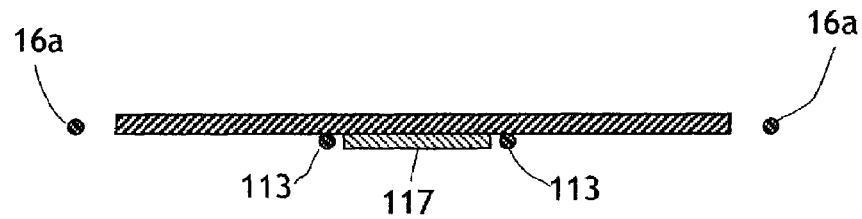
FIG. 6G is a cross-sectional elevation of a two antenna EM field transmitter combined with a propagating layer.
Figure 6H:
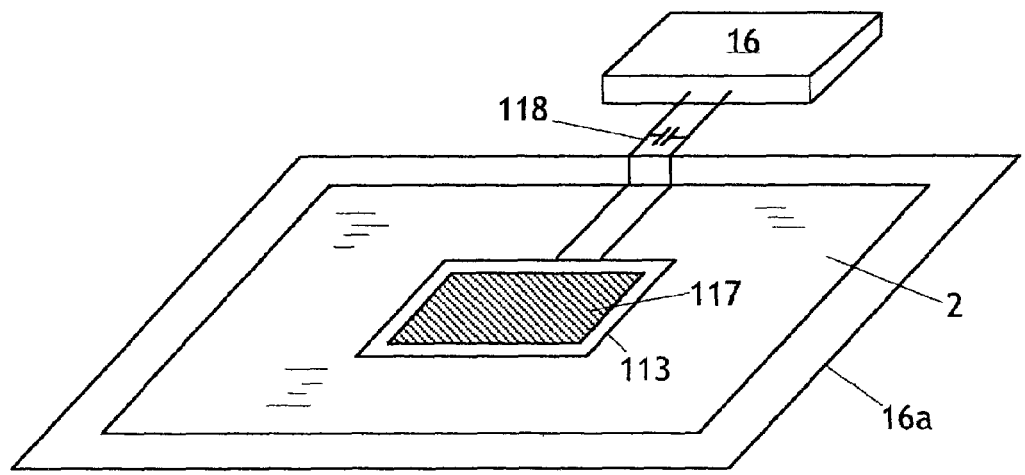
FIG. 6H is a perspective view of the two antenna embodiments.
Figure 20A:
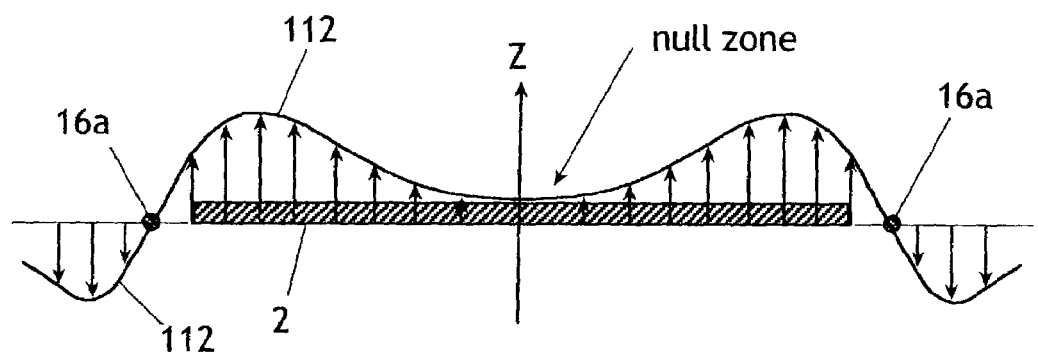
FIGS. 20A–20C are depictions of EM field strength across a touch screen for external, central, and combination antenna arrangements.
Figure 20B:
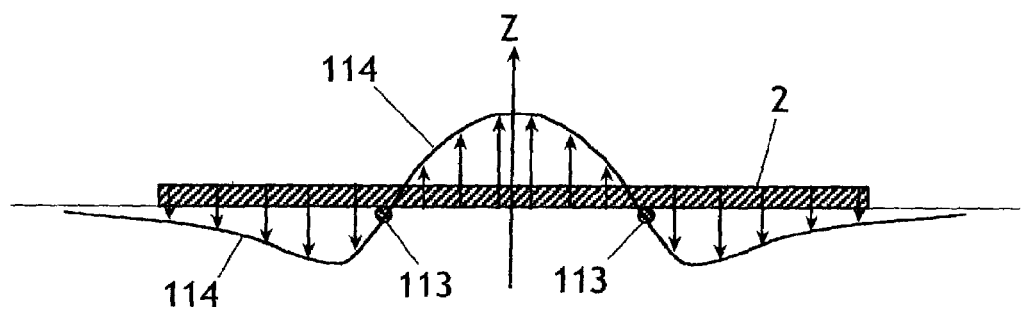
Figure 20C:
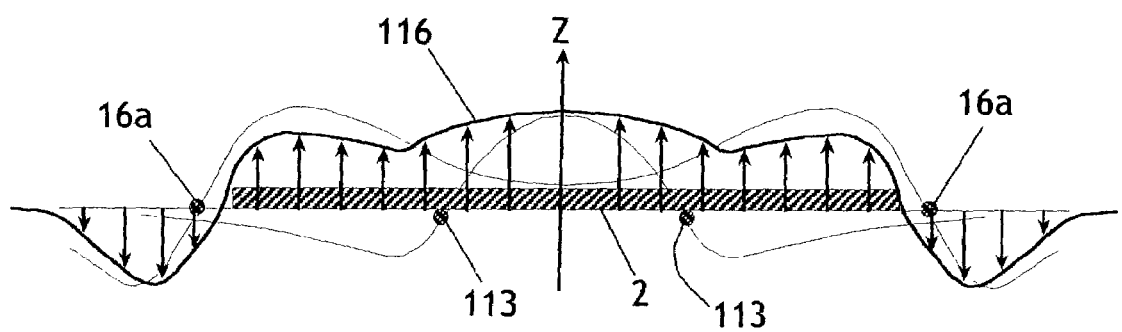

With regard to FIGS. 6F–6H, the EM power field transmitting arrangement may includes the antenna 16a extending about the periphery of a touch sensing layer 2 that is superjacent to a flat panel display 111. Alternatively, as shown in FIG. 6G, the assembly may omit the display 111 and comprise a touch input tablet assembly. In both cases, the antenna 16a may comprise a single loop of a conductor. The antenna 16a generates an EM field that has a vertical (Z) component 112 distributed across the sensing layer 2 as shown in FIG. 20A. It is noted that there is a null zone (dead spot) in the center portion of the sensing layer 2 where touch input devices may not receive sufficient power to sustain operation. To remedy this situation, the invention provides a secondary antenna 113 extending generally concentrically within the outer antenna 16a at the bottom or back surface of the sensing layer (or display 111) and connected in parallel fashion to the EM signal generator 16. The secondary antenna 113 generates a field having a vertical component 114 as shown in FIG. 20B, both Z components extending in parallel fashion in the same direction. The resultant EM field 116, shown in FIG. 20C, is the sum of the two antenna fields and does not exhibit a null zone in the medial portion of the sensing layer. In addition, a ferrite antenna 117, comprised of a flat sheet of ferrite or the like placed within the inner antenna 113, may be added to enhance the field strength in the center of the assembly. The ferrite material inside the inner coil 113 under the display 111 increases conductance of the EM field, particularly through the display assembly, allowing for a better field distribution to power devices above the typical LCD display.

The antenna assembly 16a and 113 is tuned by a parallel capacitor 118, which is selected to define a transmitting frequency that is resonant with the receiver coils 22 described above. A series capacitor or other means may be used to tune the antenna circuit. Note that the concept of a concentric layering of the EM coil can apply to even larger surface areas. For example, three or more concentric loop coils may be used to power a larger area. Note also that the sensing layer may have any convenient peripheral configuration, and is not limited to the rectangular layout shown.

The touch-input device power circuit supplies sufficient voltage to operate a waveform generator circuit 20. Each touch-input device 1 also includes a CDMA Code ROM 18a or, equivalently, a linear-feedback shift register (LFSR) generator 18b to generate unique CDMA codes which are provided to the waveform generator 20. The waveform generator 20 outputs the code at a specific frequency as either an unmodulated or RF modulated waveform. The waveform generator 20 periodically and/or continuously generate communication signals modulated by the respective CDMA code that is unique to each device 1 and stored in device 18a or 18b. These CDMA signals are provided to a contact point P (the point where the signal is injected into the sensing layer 2 by direct conduction or capacitive conduction) anywhere within an area 17 where the EM field is received and the sensing layer 2 is present (see FIGS. 4, 5, 6a). A plurality of sensors S are provided at the periphery of touch area 2 to pick up signals from the devices 1, the signals varying in voltage and current and signal content. These signals are decoded, identified, and located on an ongoing basis (i.e., tracked over time) by the method and apparatus of the invention.

Figure 10A:
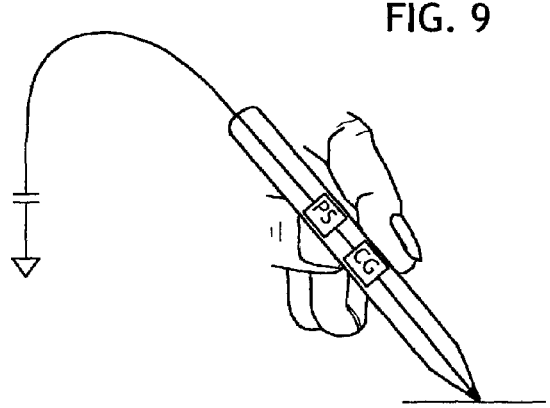
FIGS. 10A and 10B depict, respectively, designs of a tethered pen that has an electrical ground reference, and a tether-free pen design that uses a human ground reference.
Figure 10B:
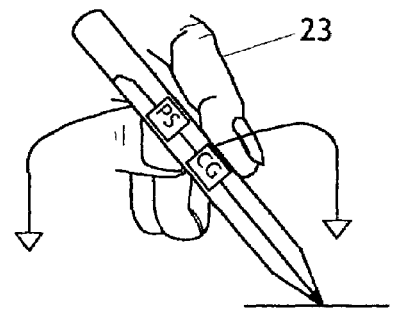
Figure 11A:
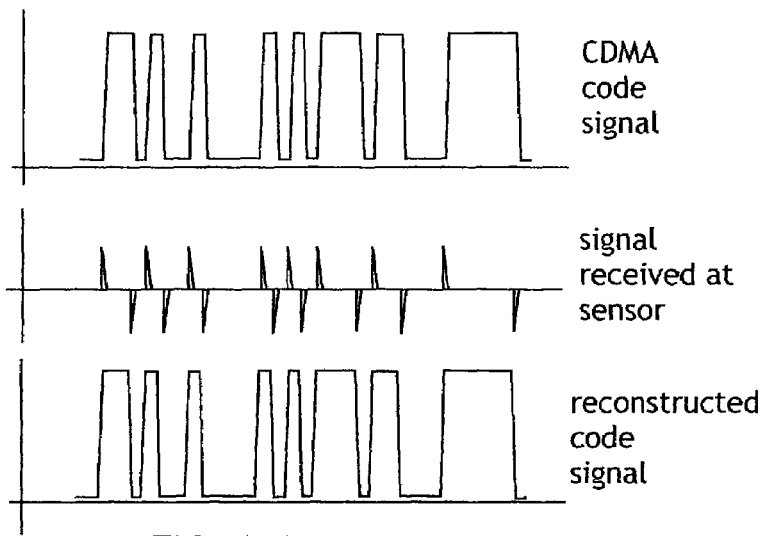
FIG. 11A depicts the signals in a method for reconstructing a CDMA code based on pulses from a tether-free touch-input device.

It should be noted that the devices 1 may be comprised of two general types: devices that are tethered to a wire and have a wired system ground (see, for example, FIG. 10A), and devices that rely on the grounding effect of the hand that is wielding the device (see, for example, FIG. 10B). Note that the CDMA code itself is transmitted at a relatively high frequency of 20 kHz or higher), and this factor greatly aids in accommodating the varied inputs from different individuals. The contact point (and capacitive point) actually behaves like a RC network that low-pass filters the hand-ground signals. Hand-ground signals are typically filled with 60 Hz hum interference and harmonics and DC bias voltages as well. The hand-ground signal spectrum shows almost nothing at 20 kHz or higher. All the hand interference gets filtered except the "edges" of the CDMA code signal, which appear at the corner sensors as pulses at about 20 µsec wide, as shown for example in FIG. 11A as "signal received at sensor." Tethered devices 1 with a wired ground connection receive signals that appear similar to the "CDMA code signal" of FIG. 11A.

With regard to FIG. 4, the signals from sensors S pass through a voltage/current divider 6. If the device 1 is untethered and grounded by the hand of the user or the like, a code reconstructor 8 is provided to receive and process the signals. (For tethered devices 1 that are grounded by wire, the code reconstructor may be eliminated.) The signals are fed through amplifier 7 to a device detector 10 which matches the signals with pseudo-random PN codes $P_1 \ldots P_N$ stored in memory 10a. The identified signals from device(s) 1 are then fed to a circuit 15 that extracts any data signals, such as switch data $0_1 \ldots 0_n$ stored in memory 15a. The signals are then fed to a locator circuit 12 that determines the location of each identified device and stores these locations in memory 12a. The identification/location data is also transmitted to a computer 13 which is operatively connected to a display associated with the touch screen assembly.

Figure 5:
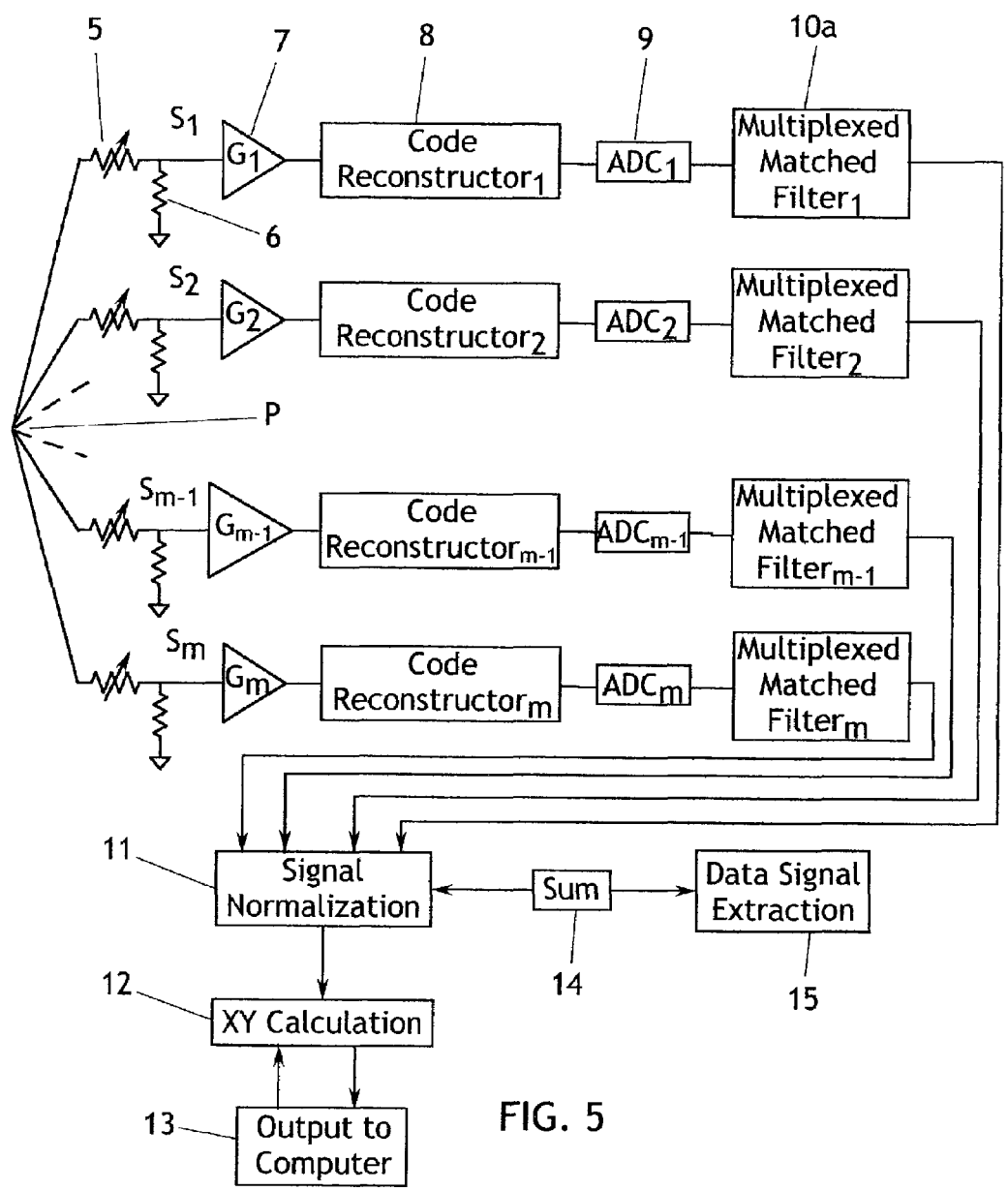
FIG. 5 depicts the detailed signal processing flowchart for each sensor channel to sense multiple touch-input devices.

More particularly, with regard to FIG. 5, the signal at each sensor S passes through a variable resistance 5 defined by the distance from point P to the sensor in the plane of sensing surface 2. For direct-contact touch the contact location P on the resistive layer varies linearly in voltage with a fixed shunt resistance 6 connected as a voltage divider). For each sensor S, an amplifier 7 boosts the signals and the code-reconstructor circuit 8 reintegrates the CDMA codes (for tether-free, hand-grounded touch device operation). An analog-to-digital converter (ADC) 9 converts the signals to digital form and a matched-filter unit 10a collects the sum of the amplified signal inputs of all functioning devices and detects which devices are present. A signal normalizer 11 removes nonlinear variations and signal fluctuations caused by changes in touch-input device to touch surface contact point 4. A data summer 14 and data extractor 15 removes any modulated data from the CDMA signal of each touch-input device. A device locator 12 determines the RSS of each device at each pickup channel and calculates the X-Y location of each touch-input device contact point P. Location and device link input-data are assembled into packets for interface with the computer 13.

Figure 1A:
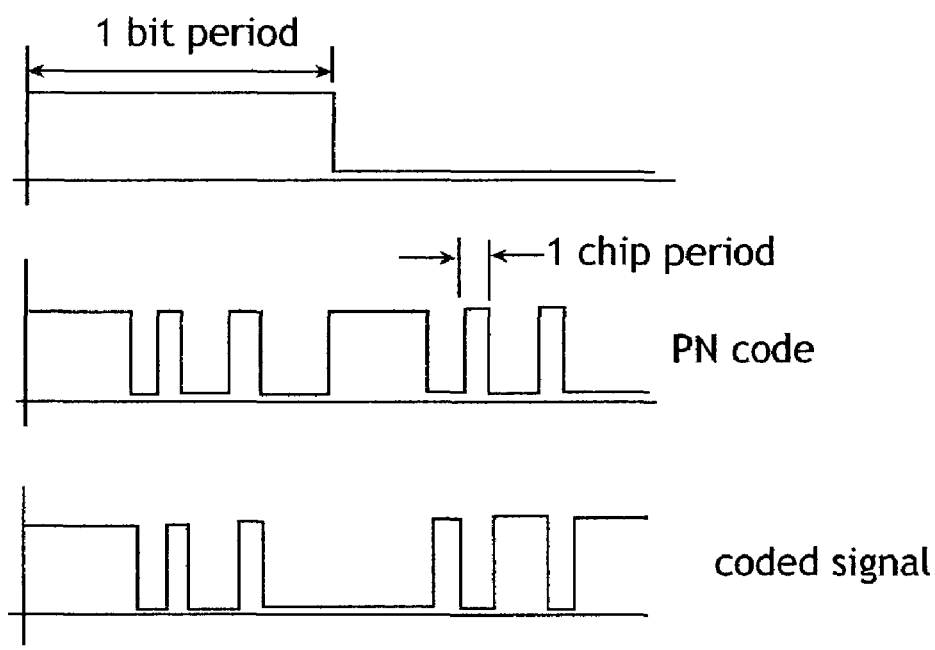
FIGS. 1A and 1B depict the time-domain DSSS signals and signal spectra of narrowband DSSS signals.
Figure 1B:
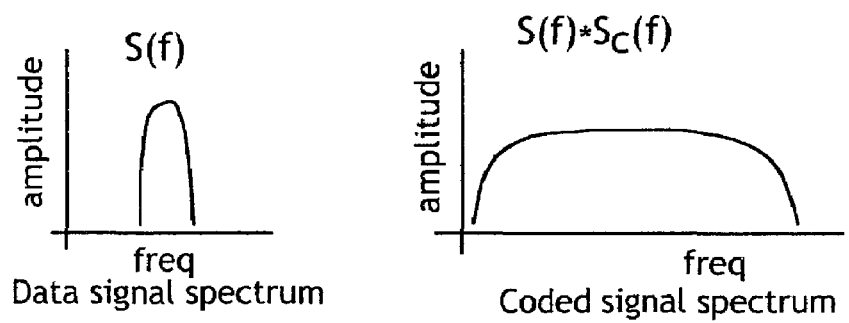
Figure 2:
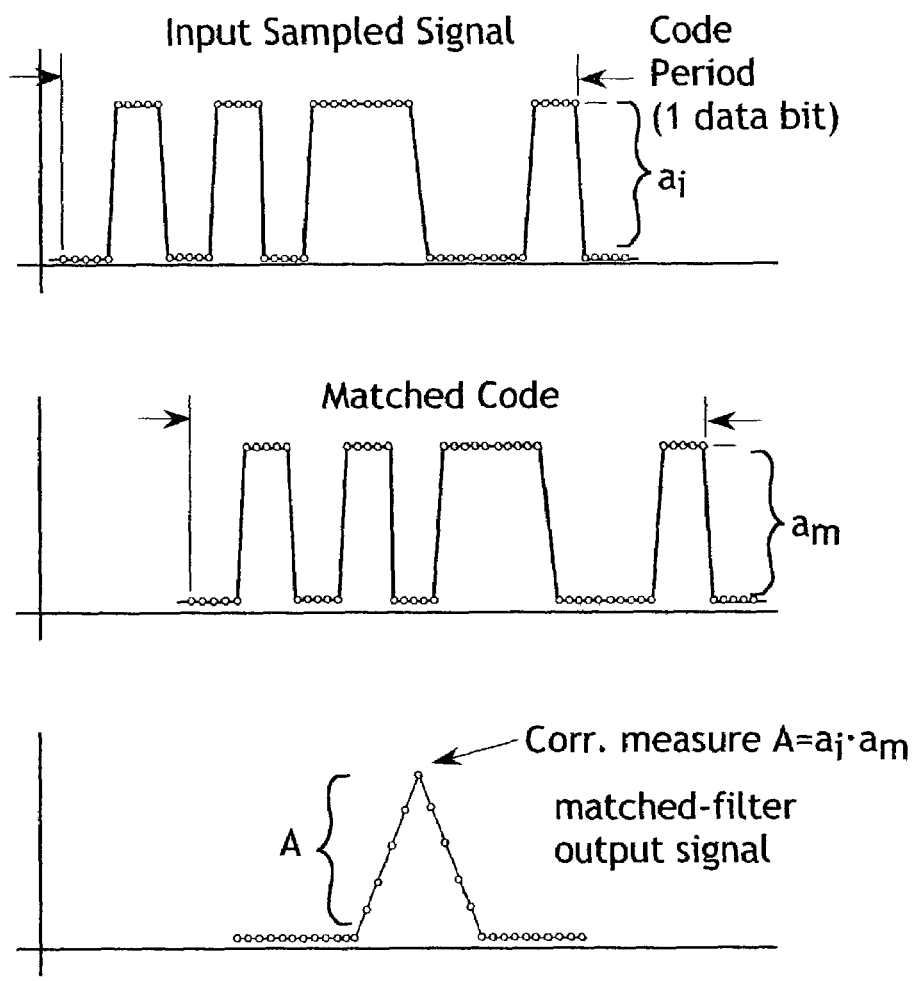
FIG. 2 depicts the input signal and code comparison inside a matched filter implementation to correlate a typical DSSS code.

There are various ways of implementing the waveform generator 20 in this invention in a cost-effective way for the touch-input device designs. With reference to FIGS. 6C, 6D, as described above, one approach is to use a digital PROM 18a to read a fixed CDMA code, or to use an LFSR 18b to generate the CDMA code using fixed circuit logic or programmable firmware. The waveform generator will first generate the CDMA signature in a square wave, and then use a bandpass filter 20a to cut off the high order harmonics to suitably shape the output pulses. The waveform generator 20 initiates its action by getting a clock signal from an internal clock source to request the next CDMA "chip" or code bit. When a sequence of this data is clocked out, it forms a CDMA code sequence signal that is passed through the bandpass filter 20a to cut off the harmonics before sending the signal to the contact point 19. Note that the CDMA code is either successively repeated after the code-end is reached or is repeated after a delay period as shown in FIG. 2.

Figure 8A:
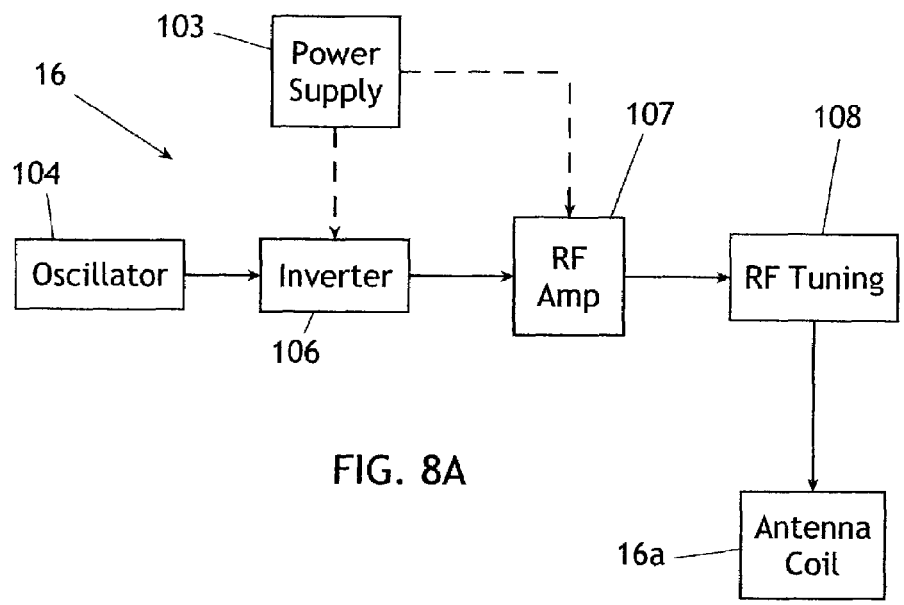
FIGS. 8A and 8B are a block diagram and schematic of an EM powering system used to transmit power to touch devices.
Figure 8B:
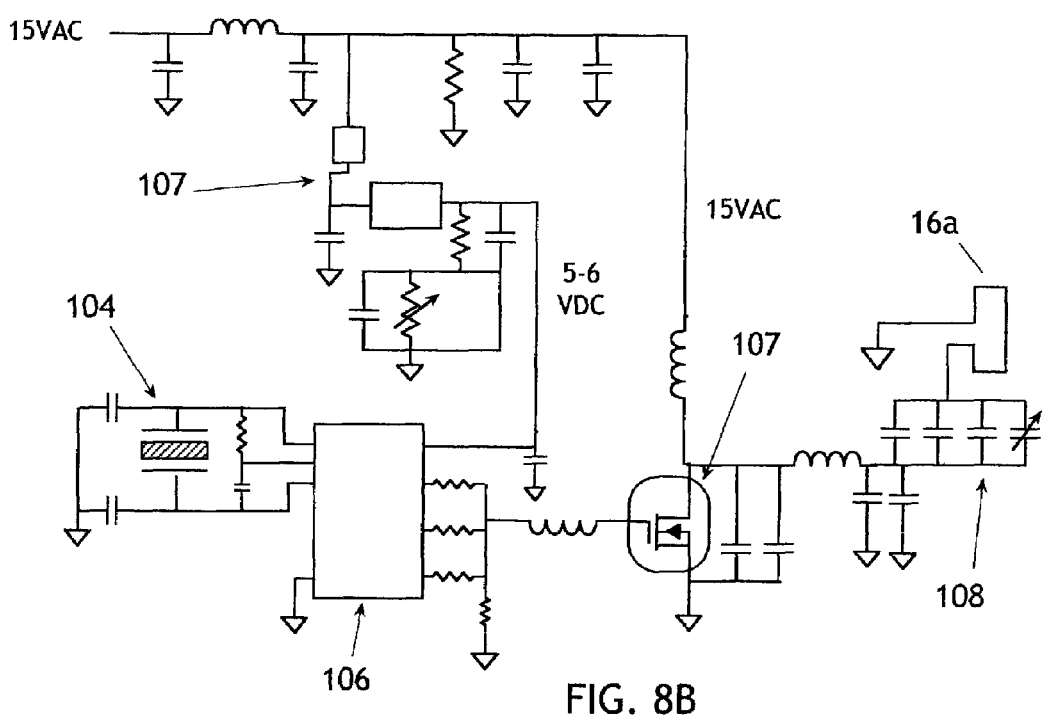

With regard to FIGS. 8A and 8B, one embodiment of the EM field generator 16 includes an oscillator 104 connected to an inverter 106. The output of the inverter 106 is connected to an RF amp 107. A power supply 103 supplies DC to the inverter 106 and AC to the RF amp 107. The output of the RF amp is connected to an RF tuning section, which sets the proper frequency for the antenna coil 16a.

Figure 8C:
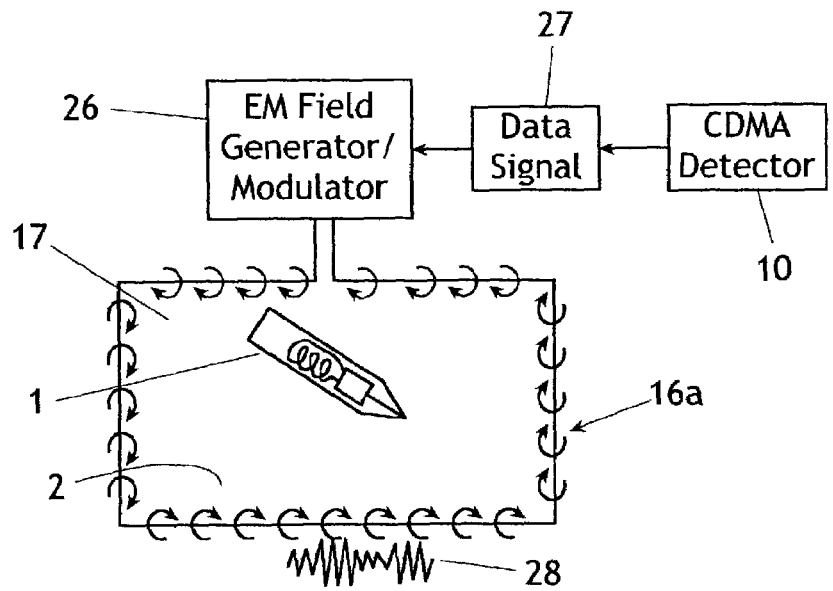
FIGS. 8C and 8D depict an EM powering system to synchronize codes from semi-active touch-input devices.
Figure 8D:
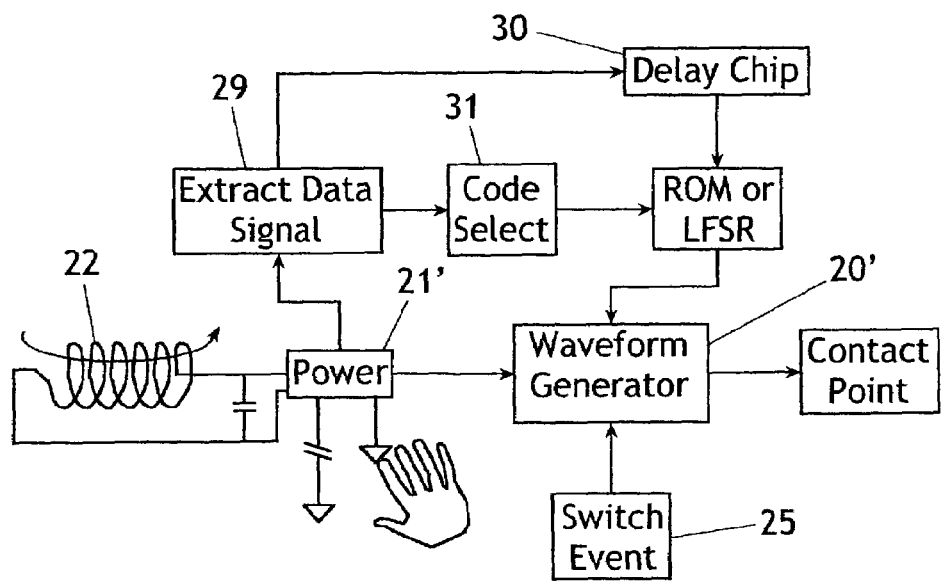

Another aspect of the invention, shown in the embodiment of FIGS. 8C and 8D, is to provide the EM powering field 17a with an input modulation 28 to form a radio link to communicate to one or more touch-input devices 1. Each device (1) is semi-active as the EM modulated data signal 27 is received in touch-input devices power circuit 21' and decoded by an extraction circuit 29. A chip delay event 30 is sent to the code generator 20' to select a specific code 31 and/or synchronize with the CDMA code detection receiver 10 (FIGS. 4 and 5). This embodiment is potentially required if touch-input devices are to be "semi-active;" that is, they are instructed to send specific CDMA codes for the purpose of avoiding interference with the identification and location of other devices, and so that their correlation peaks are synchronized (i.e. assigned specific time slots) by the CDMA detector 10.

Figure 7A:
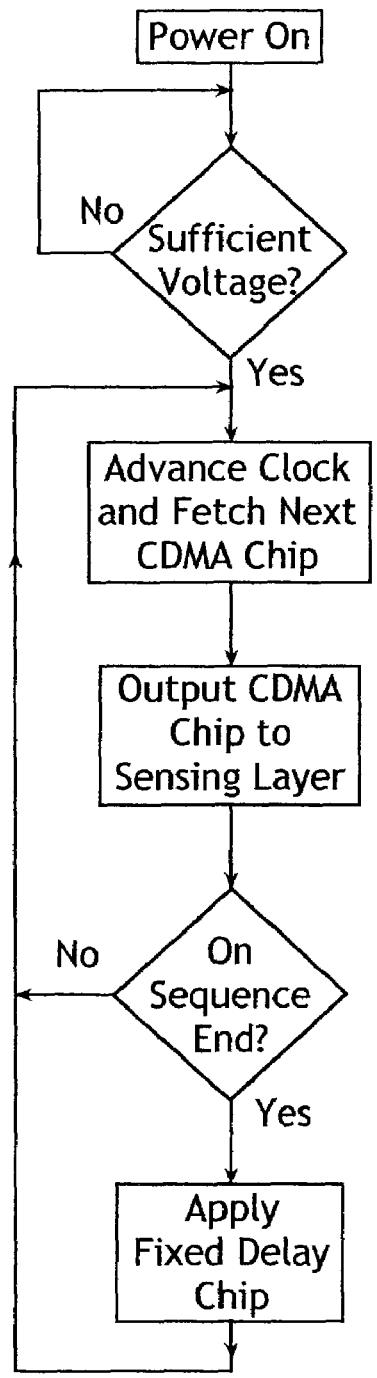
FIGS. 7A, 7B depict the detailed system operation flowcharts of an active touch-input device, and the CDMA code detection system.

The operation flowchart for signal output of an active touch-input device is illustrated in FIG. 7. In FIG. 7A, after device power-up the code generator 20 will immediately start clocking and fetching the next CDMA chip. This chip is output through the circuitry of FIG. 6C or 6D to the sensing layer 2. When the On sequence ends, the system applies a fixed delay chip, producing a code chip sequence reiteratively with a fixed programmed delay between code periods. This step applies to active devices such as battery or coil powered touch-input devices.

Figure 8E:
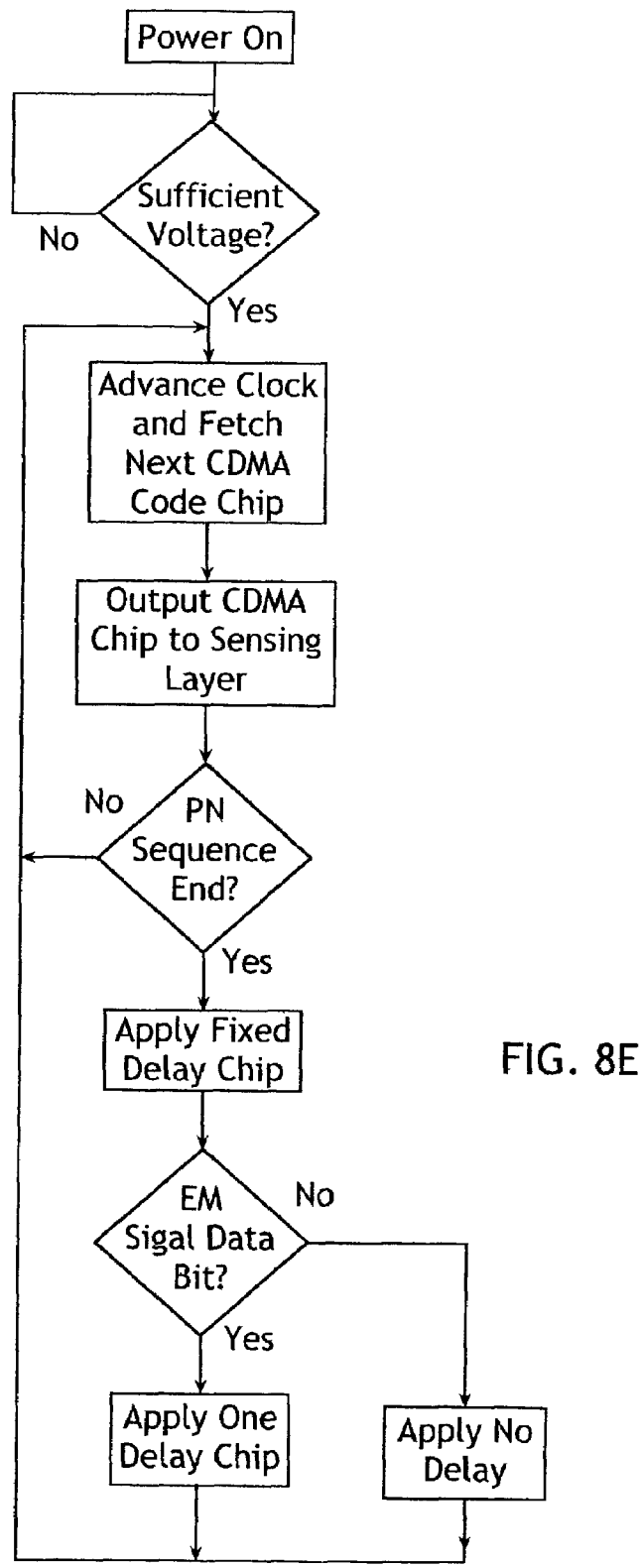
FIG. 8E is a modified form of the flow chart of FIG. 7A.

With regard to FIG. 8E, however, the flowchart of FIG. 7A is modified if a modulated power signal 28 is being transmitted. After the fixed delay chip is applied, the device checks for bits 27 encoded in the power coil RF modulated signal 28. If a bit is present, the system will apply a delay of one chip, otherwise no additional delay will be applied. These code signatures are then passed through a bandpass filter 20a and then delivered to the contact point P to couple with the touch-sensing surface 2, completing the touch-excitation procedure. Thus the waveform generator 20' will program the delay 30 between code periods in accordance with the detector's synchronization requirements, and the CDMA detector 10 controls the delay to avoid conflicts in code transmission and detection. This is an important feature in enabling the simultaneous operation of multiple devices without interference.

This touch-sensing surface 2 comprises a conductive layer that may be incorporated in a screen assembly, typically (but not necessarily) in combination with a flat panel display, monitor, or other graphic output device. The screen assembly may include a plurality of lamina, and the conductive layer 2 is typically protected by an outer layer of more durable material, such as glass or optical grade plastic material or a durable coating. Alternatively, the conductive layer may be disposed at the back surface of the assembly.

Figure 11B:
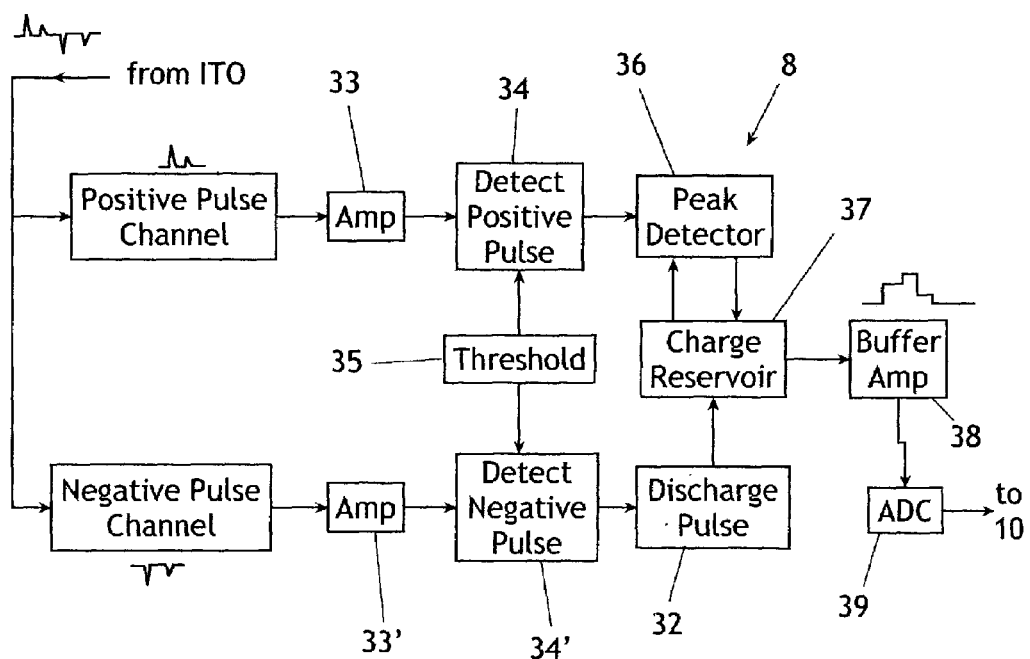
FIGS. 11B and 11C are a detailed flowchart and schematic for processing a tether-free touch-input device to reconstruct the CDMA codes sent by touch-input devices through a touch screen.
Figure 11C:
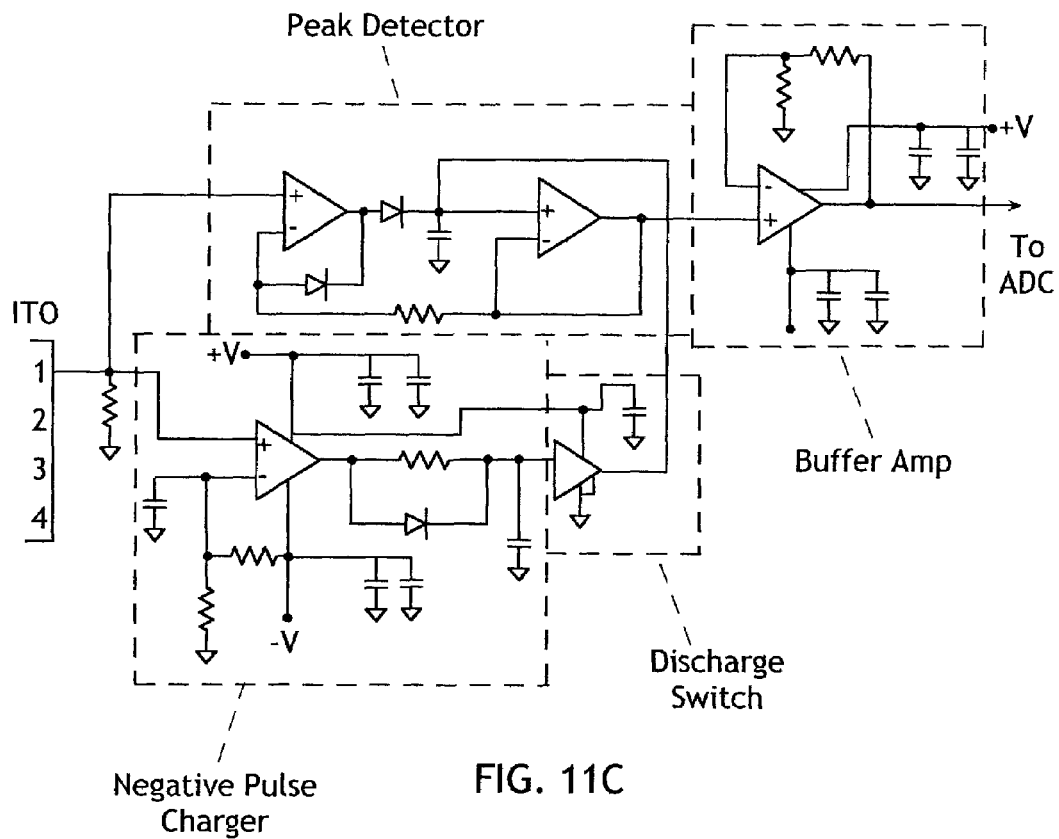

As shown in FIGS. 11B and 11C, one embodiment of the code reconstructor 8 includes positive and negative channels connected to the signals from sensors S. The positive pulse channel includes an amplifier 33 which feeds a positive pulse detector 34. The output of detector 34 feeds peak detector 36 Amplifier 33, positive pulse detector 34 and peak detector 36 turn positive pulses into a step function voltage in charge reservoir 37 with amplitudes equal to the amplitude of the positive pulse. The negative pulse channel includes amplifier 33' and negative pulse detector 34'. The negative pulse detector 34' is connected to a pulse discharge device 32 that feeds the charge reservoir 37. The negative pulse circuit is arranged to step down the voltage level in the charge reservoir 37 by stepwise amounts. This may be accomplished, for example, by activating a switch to selectively discharge a capacitor in the peak detector. An output amplifier 38 boosts voltage levels suitable for an ADC 39 to sample the signals. This circuit will reconstruct the original combined CDMA signal for one or a plurality of CDMA codes embedded in the original signal, and transmit this data to the device detector 10.

Figure 11D:
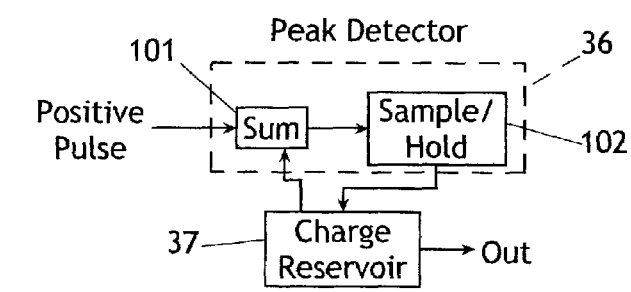
FIG. 11D is a flowchart depicting the method for detecting signal peaks.

With regard to FIG. 11D, one embodiment of the peak detector 36 may comprise a summing unit 101 that receives the positive pulse from pulse detector 34. The summing unit 101 outputs to a sample/hold device 102, which in turn outputs to the charge reservoir 37 described above. The voltage level of the charge reservoir is connected as the other input of the summing unit 101. The incoming positive pulse is summed with the instantaneous voltage level of the charge reservoir, and the sample/hold device 102 operates in stepwise fashion and sends the summed level to the charge reservoir 37, where the new level from the sample/hold device is stored until the next positive pulse is received. Note that the instantaneous voltage level of the charge reservoir is also affected (decreased) by the discharge events created by the negative pulse circuit. 33', 34', and 32. FIG. 11C illustrates an embodiment of an analog version for the CDMA code reconstructor circuit 8.

Figure 7B:
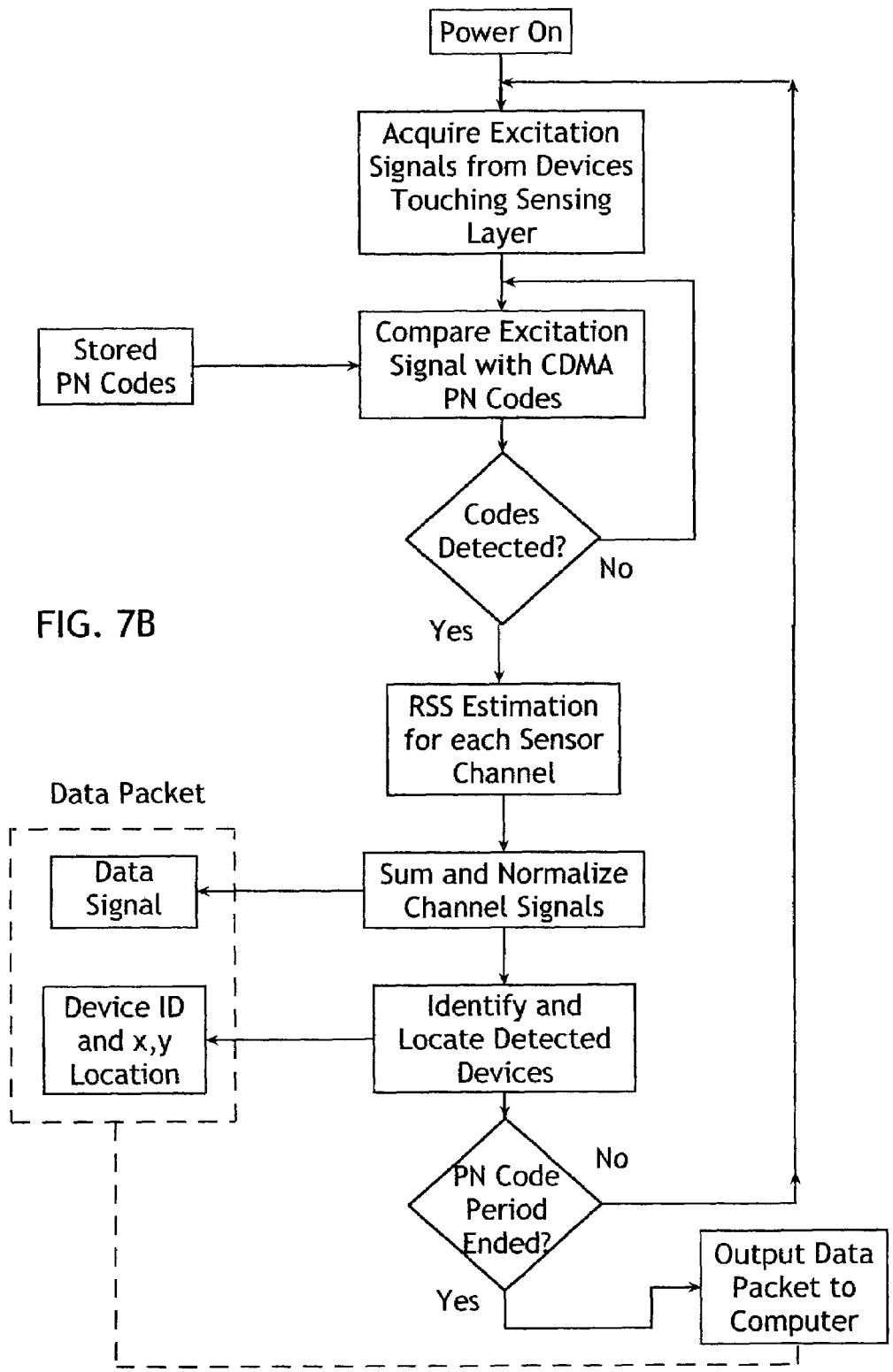

The operation flowchart of the touch-sensing architecture is illustrated in FIG. 7B. After power up, the system looks for excitation signals from whatever active and/or semi-active touch-input devices 1 are currently operating with the touch screen sensor assembly. These signals are compared with stored PN codes to determine which CDMA codes are present in the input signals. To identify the presence of a touch-input device, if the RSS of that device exceeds a preset threshold, it is recognized to be operating on the screen. A linear RSS model is used to calculate the position of each touch-input device. It is noted that the conductive layer 2 (FIG. 4) comprises an impedance that is distributed uniformly in the plane of the layer. The signal of each active touch stimulating device 1 is received by all of the sensors S, and the strength of each received signal is directly related to the distance from the position of each active touch stimulating tip on the layer 2 to each of the sensors S. After matched-filtering the received signals with the CDMA code from each touch-input device, the RSS of each device can be determined. The sensor signals are summed and normalized to neutralize variations in signal strength due to surface contact irregularities and the like. Calculations may then be carried out to determine the active touch stimulating position relative to the sensors S, and thus to a X-Y coordinate system (see FIG. 13). A data packet is created that includes the device ID and x,y location, which is transmitted to the computer when the code period has ended. In this fashion a plurality of active touch stimulating devices (1) may be tracked concurrently.

Figure 3:
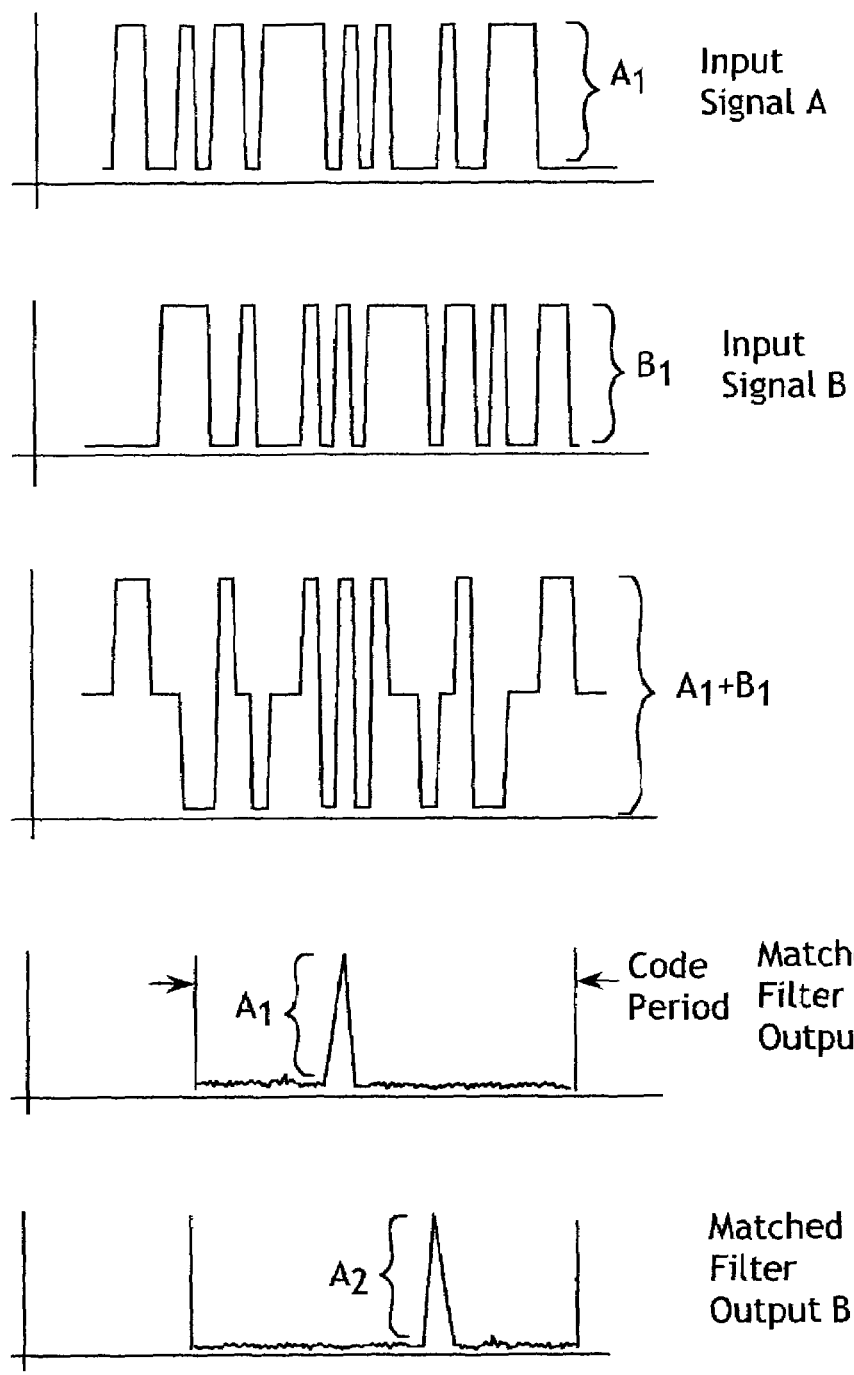
FIG. 3 depicts a method of detecting multiple DSSS codes embedded in a common input signal.

As shown in FIG. 3, two examples of CDMA codes of active touch stimulating device signals, CDMA code $A_1$ and CDMA code $B_1$, are comprised of binary bits in series. These two codes occupy the same spectrum, which is fairly flat across the entire signal bandwidth. Generally speaking, the number of ones and zeros in a CDMA code are approximately equal and evenly distributed in time so that the spectrum is generally flat. If matched-filtering is applied to the sum of CDMA code A and CDMA code B then a correlation peak is output separately for each code match depending on which CDMA code is in the filter coefficient array. Note that if CDMA codes A and B are mutually orthogonal then two distinct peaks $A_1$ and $A_2$ will appear in the filter or correlator output. The amplitude of these peaks is equal to the square of the signal amplitude received by the sensors S and therefore the signal processing firmware must perform the square-root operation on each output peak to get the proper RSS amplitude measurement.

As used herein, the term orthogonal is defined as having two code functions $f1(t)$ and $f2(t)$ such that $f1*f2(t)=0$ for all time "t," where * is the convolution operator. In this case we limit time to the code period of the PN sequence for code sequences $C1(i)$ and $C2(i)$, and our matched filter produces $H(i)=C1(i)*C2(i)=Sum(C(i)C(j-i))$ where the sum is over all j points in the code period. Code sequences C1 and C2 are orthogonal if the filter output H(i) is close to zero for every "i" time in the code sequence. Note that PN sequences are not perfectly orthogonal, and that is the reason why they are called pseudo-noise. A1 and A2 are the amplitudes of the correlation peaks in the CDMA signal channel. An amplitude is measured for each channel to detect and locate a device. The orthogonality of the codes used allowed each amplitude to be separated. Adding more devices can diminish the performance because that will raise the noise level in the CDMA channel making the correlation peaks noisy and the amplitudes less reliable. This problem can be solved by making the codes longer to improve the SNR. Making the code longer will reduce the response time to locate devices. However, making the chipping rate faster will provide more correlation peaks in a shorter time.

In the event that the device CDMA code "chipping" rate differs slightly from chipping rate inside the CDMA detector and processor 10, the invention provides adaptive detection and synchronization of CDMA codes with the touch-sensing device. FIG. 2 indicates that when a CDMA code is sampled using the ADC 9 of each signal channel (i.e. in the circuit from sensor to ADC) the ADC 9 typically must over-sample the signal by a factor of 5 to 10 times faster than the CDMA chip-rate. This ensures that a correlation peak will always form a triangular shape when output from the matched filter. If there is a slight discrepancy in chipping frequency between the touch-input device and CDMA detector and processing unit 10 then a correlation triangle will appear distorted but will always form a distinct peak inside the code period. The degree of tolerance of discrepancy in chipping frequency improves with a higher over-sampling rate of the ADC to the CDMA chipping rate.

Figure 9:
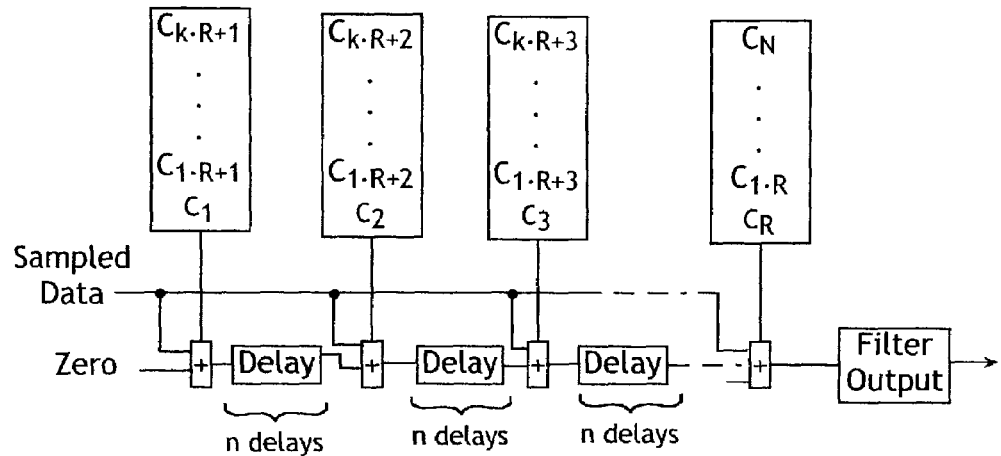
FIG. 9 is a detailed flowchart of the transposed-form matched-filter implementation for detecting multiple devices with CDMA codes.

One embodiment of the CDMA detector and processing unit 10A is the use of a parallel transposed-form FIR matched-filter. FIG. 9 illustrates the design of this filter implemented to allow parallel detection of one or a plurality of CDMA codes at high speeds. This filter is designed to share firmware resources and allow CDMA code multiplexing to detect up to "R" CDMA codes in a single code period. For example, if a channel signal is sampled at "N" MHz then this filter can sample up to R different CDMA codes (representing R distinct devices) at a multiplexed rate of "R×N" MHz. The number of PN cycles needed to check all device codes is K=M/R, where M is the number of devices in use. This method of designing a filter is flexible depending on the number of maximum touch-input devices required.

Figure 12:
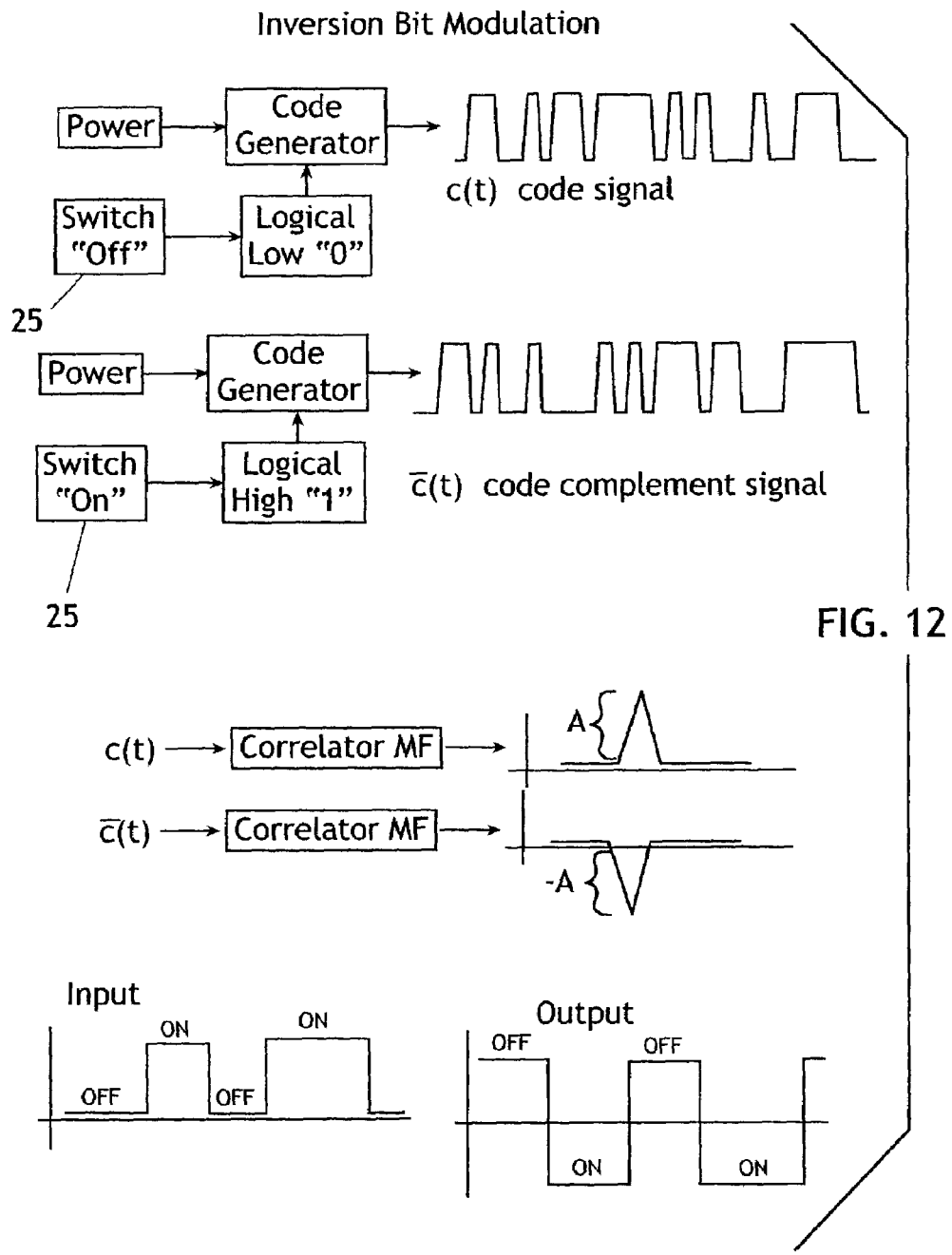
FIG. 12 depicts a method of using CDMA codes to communicate data bits from touch-input devices.

Another salient feature of this invention is that a CDMA code can be used to convey a binary communication link between a touch-input device and the touch sensing surface. In FIG. 12 one or more touch-input devices 1 are provided with a switch 25 to convey a switch event data to the CDMA detector and processing unit 10. Binary switch events (e.g. such as right or left mouse click) can be conveyed in the CDMA signal using bit-inversion modulation. That is, when switch 25 is off, a logic "0" is sent to the code generator 20 or 20', and the code signal c(t) is generated as described previously. When switch 25 is on, a logic "1" is sent to the code generator, which generates the complementary code signal c(t). The CDMA detector and processing unit 10 recognizes this complementary modulation as an inversion of the correlation peak (−A), thereby allowing the controller to convey the event data as a sign change in the correlator output as often as every code period.

With regard to FIG. 6E, there is illustrated one embodiment of the device electronic circuit that provides a binary communication link between a touch-input device and the touch sensing surface. An antenna coil 41 receives the power signal from the field coil 16a, and a ferrite antenna 42 may optionally be provided to enhance field coupling. The antenna resonant frequency is controlled by capacitive network 43, which includes a trimmer capacitor for fine tuning to the field frequency. The antenna signal is rectified by diode 44 and smoothed by RC network 45, and fed to the On and In ports of a voltage regulator 46. The output of the voltage regulator 46 is conducted to the power input of microprocessor 47, which performs all the code generating tasks described above. The microprocessor 47 is grounded to the device chassis, which in turn is grounded by the hand of the user. The output of the microprocessor is input to one input of XOR gate 49, the other input being connected to a SPST switch 48, which is a simple click/double click switch known in the prior art. The output of the gate 49 is conducted to the device input tip and thence to the sensing layer 2. As noted above with regard to FIG. 12, closure of the switch 48 causes the output signal of the microprocessor to be inverted, thereby signaling to the touch sensing system that a click event has occurred in the device. Alternatively, if the microprocessor provides an input port that performs output inversion, the switch 48' may be connected to the inverter port (shown in dotted line) and the XOR gate 49 may be eliminated.

With regard to FIG. 21, a simple embodiment of the antenna coil 41 and ferrite antenna 42 comprises a plurality of windings wrapped helically about a cylindrical ferrite component. The ferrite causes more lines of flux to pass through the coil 41, increasing the output of the coil 41 to a voltage sufficient to operate the touch input circuitry described herein. As shown in FIGS. 22A and 22B, another embodiment includes a plurality of windings 141 extending helically about a cylindrical ferrite antenna 142. A hole 143 extends through the ferrite antenna parallel to the cylindrical axis thereof. A capacitor 144 is secured at one end of the antenna 142, with one lead wire 146 extending from the capacitor through the hole 143 to connect to one end of the antenna coil 141, This arrangement enables connection between the capacitor and coil without protruding outwardly from the outer diameter of the windings 141, whereby the assembly is made as narrow as possible. Another lead wire 147 extends from the capacitor to the other end of the coil 141, forming a resonant antenna circuit (leads to the power regulator are not shown).

With reference to FIG. 23, a further embodiment of the antenna assembly includes a ferrite component 151 formed as a closed cylindrical torus with an inner annular chamber 152 and a central bore 153 (which may be used as a wire via or the like). An antenna coil 154 extends helically in the chamber 152, the coil extending about the axial portion of the torus. In this configuration, the axial portion acts as a core to concentrate the lines of flux within the coil, and the outer annulus provides a more efficient flux return path, as shown schematically by the vertical component vectors. Likewise, in the embodiment of FIG. 24, where like components have the same reference numeral with a prime (') designation, the ferrite component 151 is formed as an open torus, with chamber 152' open to one end of the cylindrical configuration (for simplicity of construction).

The antenna assembly embodiments of FIGS. 21–24 may be employed in any form of touch input device, such as, but not limited to, the pen, knob, fader, joystick, mouse, and the like. The ferrite antenna concentrates the EM field lines of force, resulting in the inductance of a higher voltage than when the ferrite antenna is not used. Thus the ferrite antenna permits the use of an antenna coil having a smaller diameter than an air-core antenna coil, bringing the coil dimensions to within the size range of a typical pen configuration.

Figures 13, 14:
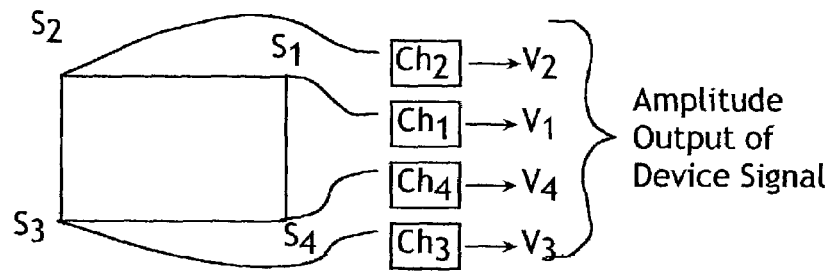
FIG. 13 depicts the calculation required to normalize and calculate the X and Y location of a CDMA coded touch-input device on a touch screen.
FIG. 14 indicates a calibration method for precisely calibrating the location offset and scale factor.

As noted above, variations in the coupling of the signal voltage between the touch-input device and the touch screen (contact or capacitive) may cause amplitude variations to appear in the output signals. Generally the contact is never consistent because of imperfections in the sensing surface area, surface roughness (causing contact "skips" or sudden loss of touch contact), changing voltage levels in the touch-input device, inadequate tether-free grounding potential, and the like. This problem may be overcome easily by using a normalization step, as described with reference to FIGS. 5 and 7B. As shown in FIG. 13 normalization involves taking the voltage $V_1 \ldots V_4$ from each sensor $S_1 \ldots S_4$ and calculating the X and Y coordinate as shown, wherein each value is the result of dividing by the summed voltages from all the sensors. This process tends to neutralize variations in signal strength from the touch input device.

However, normalization introduces nonlinear distortion effects in the X-Y position calculation when a touch-input device is positioned near the sensors. The reason this occurs is that the sum of all sensor signals is not a constant voltage (or current) over the touch-sensing area but instead gets larger near any one of the sensors. In the case where X-Y position is calculated to present touch-input device locations on a display area (such as an LED screen seen under a transparent touch screen) a method is required to correct for position errors. The software algorithm presented in FIG. 14 can be used to correct for inaccuracies of misalignment between the sensor and a display area, to rescale the active sensor area to the display area, or correct offset errors in the sensor/analog hardware. The algorithm may be executed separately for any touch-input device to eliminate accuracy differences between specific device types. The user is required to touch a minimum of two points $X_L$ and $X_u$ presented by the display on the lower left and upper right of the display area to "rescale" the reported coordinates to these points. Other methods require touching a displayed grid of points over the entire screen to provide more calibration detail.

CDMA methodology has been used for wireless communications by military organizations to encode communications information so that the carrier appears to be noise, and thus to be difficult to detect and intercept. CDMA systems operate with high reliability in noisy environments, yet require relatively low power and have relatively high data rates. In this invention, CDMA methodology is used in several unique ways:
  1) The system may use only one-way communications from the active touch stimulating device(s) to the screen assembly, rather than two-way communications of prior systems;
  2) Once the RSS is obtained, it is used for both device detection and location tracking. In typical CDMA communications systems, RSS is used only for detection.
  3) This invention uses the sensing layer 2 as the signal propagation medium, rather than a broadcast EM field used in wireless CDMA communications. The sensing layer as a propagation medium enables the linear RSS model for the positioning of the system.
  4) The number of active touch stimulating devices may be one, or more than one, depending on the needs of the user.

With reference to FIG. 5, the entire analog circuitry for an active touch stimulating device may be embodied in one custom ASIC having approximately 2000 gates or less. Similarly, all digital components of this design may also by encoded as firmware to be downloaded into a microcontroller or FPGA chip. That is, the power supply circuit 21, the waveform generator 20, and the front-end analog circuits (7, 7a, 8, 9) may all be performed in an ASIC. The CDMA code ROM 18*a* or LFSR 18*b*, Code signal generator 20, and CDMA processing Unit 10, and X-Y location calculation 12, and data signal extraction 15, may be coded into firmware for download into a FPGA, or microcontroller. These possibilities will minimize the device size and enable a device and controller of small dimensions. The use of a custom ASIC, or readily available microprocessor or FPGA chips also makes the active touch stimulating devices more rugged by reducing component connections, and it minimizes power consumption.

Figure 15A:
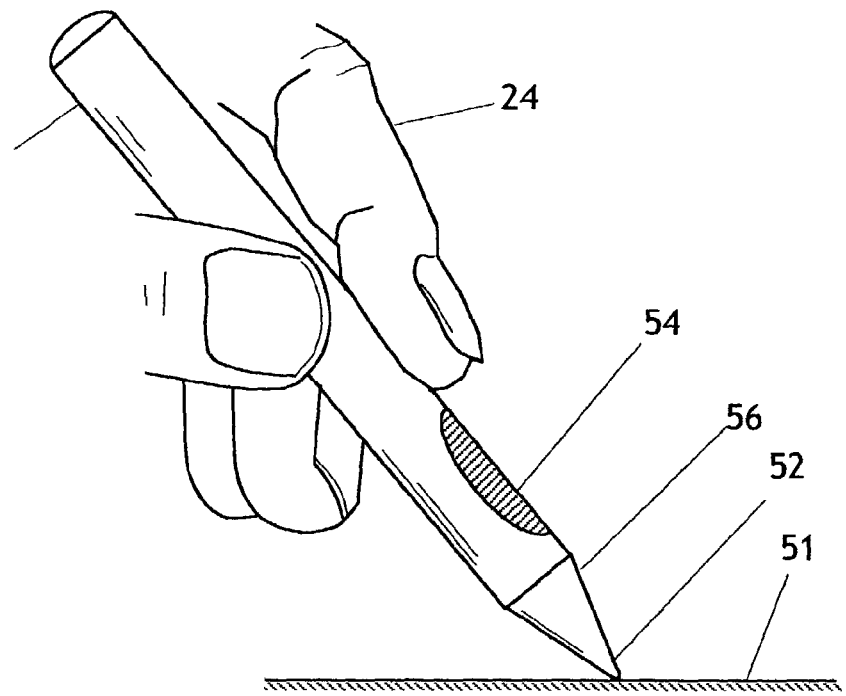
FIG. 15A is a side elevation view of a stylus or pen controller in accordance with the present invention.
Figure 15B:
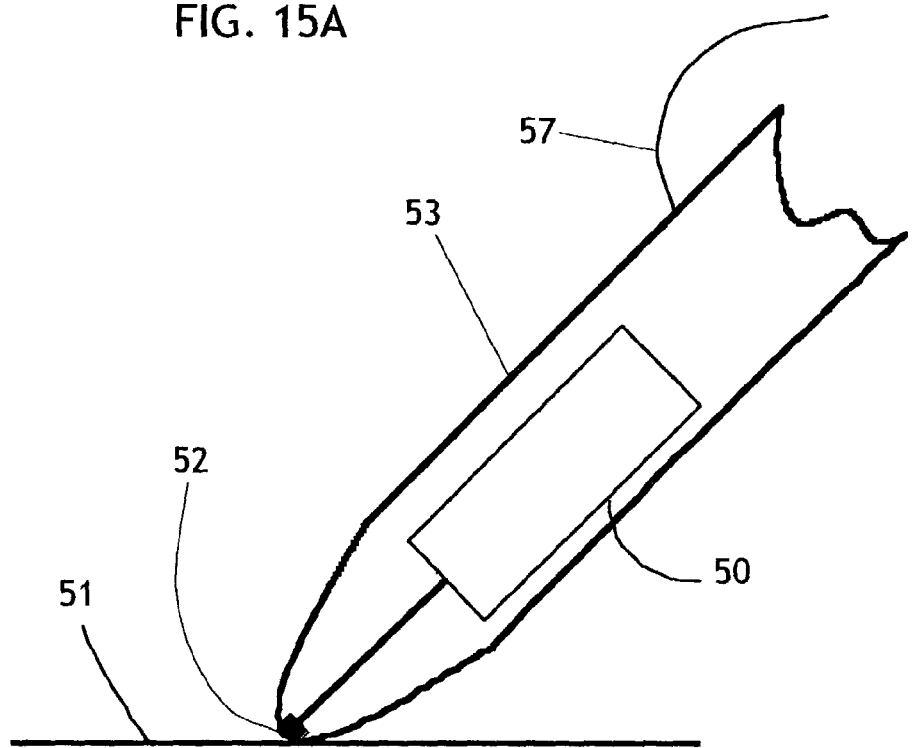
FIG. 15B is a cutaway side elevation of a pen input device in accordance with the present invention.

The active touch-input device 1 may take any of several forms that have been disclosed in the prior art. With regard to FIGS. 15A, 15B, a further embodiment of the active touch stimulating device is a pen or stylus. The pen or stylus may include a signal generating circuit 50 and a tapered contact end 55 supporting the active touch stimulating tip 52 extending toward the screen layer 51 to emit the excitation signal. This includes a touch-input generating circuit 50 and a touch contact point 52. The pen may have an insulated chassis 53 with a ground cable 57 extending to the same ground 23 as the detector circuit 8, or have a metallic or other conducting material chassis 53 such that the device is grounded to a human hand 24. The active touch-stimulating tip 52 extends toward the screen layer 51 to emit excitation signals generated by circuit 50, so that the screen assembly detects the CDMA code and tracks the movement of the tip 56 of the pen. This arrangement enables the screen assembly to detect and track the movement of the tip 52. The stylus may be wielded in the manner of a pen or pencil to mark or write on the sensing layer 51. A switch 54 will send data click events to the code generator 50 to send modulated data signals to the CDMA detector circuit 8, as explained in the preceding description.

Figures 16A, 16B:
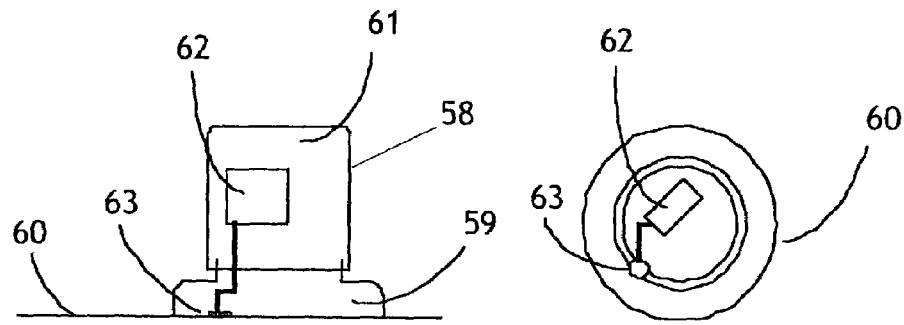
FIGS. 16A and 16B are a side elevation and top view of a touch input knob controller in accordance with the present invention.

As shown in FIGS. 16A–16B, a knob controller 58 may include a base portion 59, adhered to the sensing surface 60, and upon which is mounted an upper portion 61 adapted for rotation about a common axis. The upper rotatable portion 61 also includes a device circuit 62 and an active touch stimulating tip 63 extending toward the screen layer 60 to emit excitation signals generated by circuit 62, so that the screen assembly detects rotation of the upper portion by identifying the CDMA code and tracking the movement of the tip 63 about the base 59.

Figures 17A, 17B:
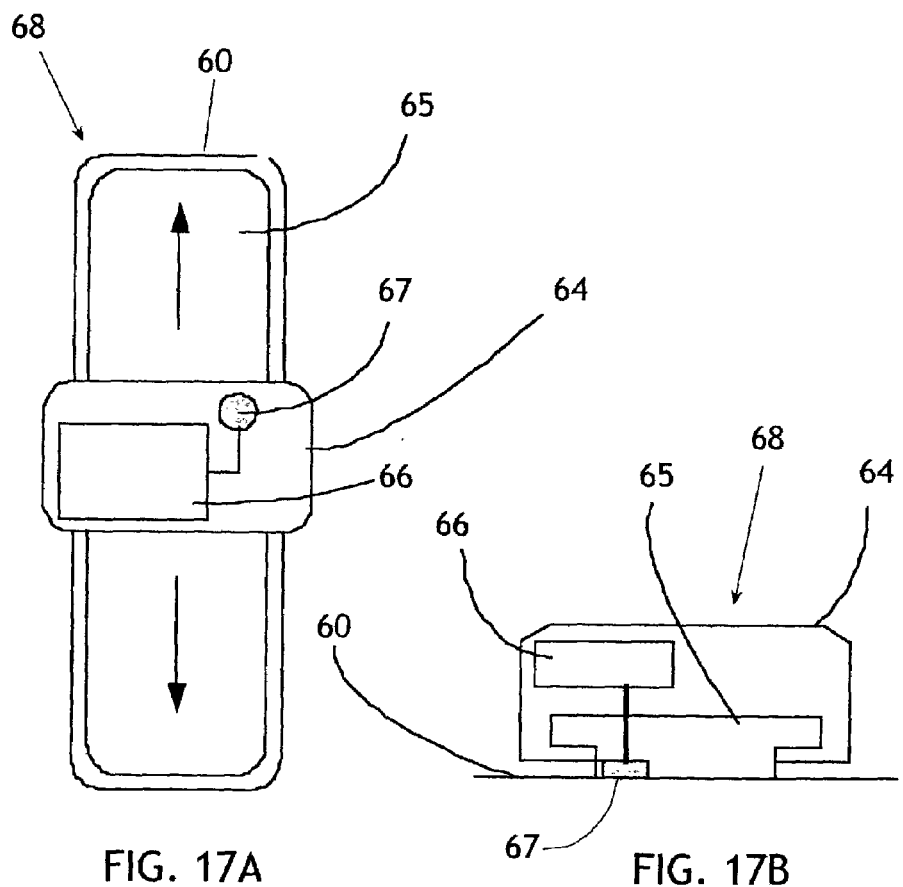
FIGS. 17A and 17B are a top view and a side elevation of a fader controller in accordance with the present invention.

With regard to FIGS. 17A–17B, a fader controller (slider) 68 includes an elongated base portion 65 upon which a fader cap 64 is slidable to vary and select values in accordance with the position of the cap along the base. The upper slidable portion 64 also includes a device circuit 66 and an active touch stimulating tip 67 extending toward the screen layer 60, so that the screen assembly detects translation of the upper portion by identifying the CDMA code generated by circuit 66 and tracking the movement of the tip 67 in longitudinal movement along the base 65.

Figure 18:
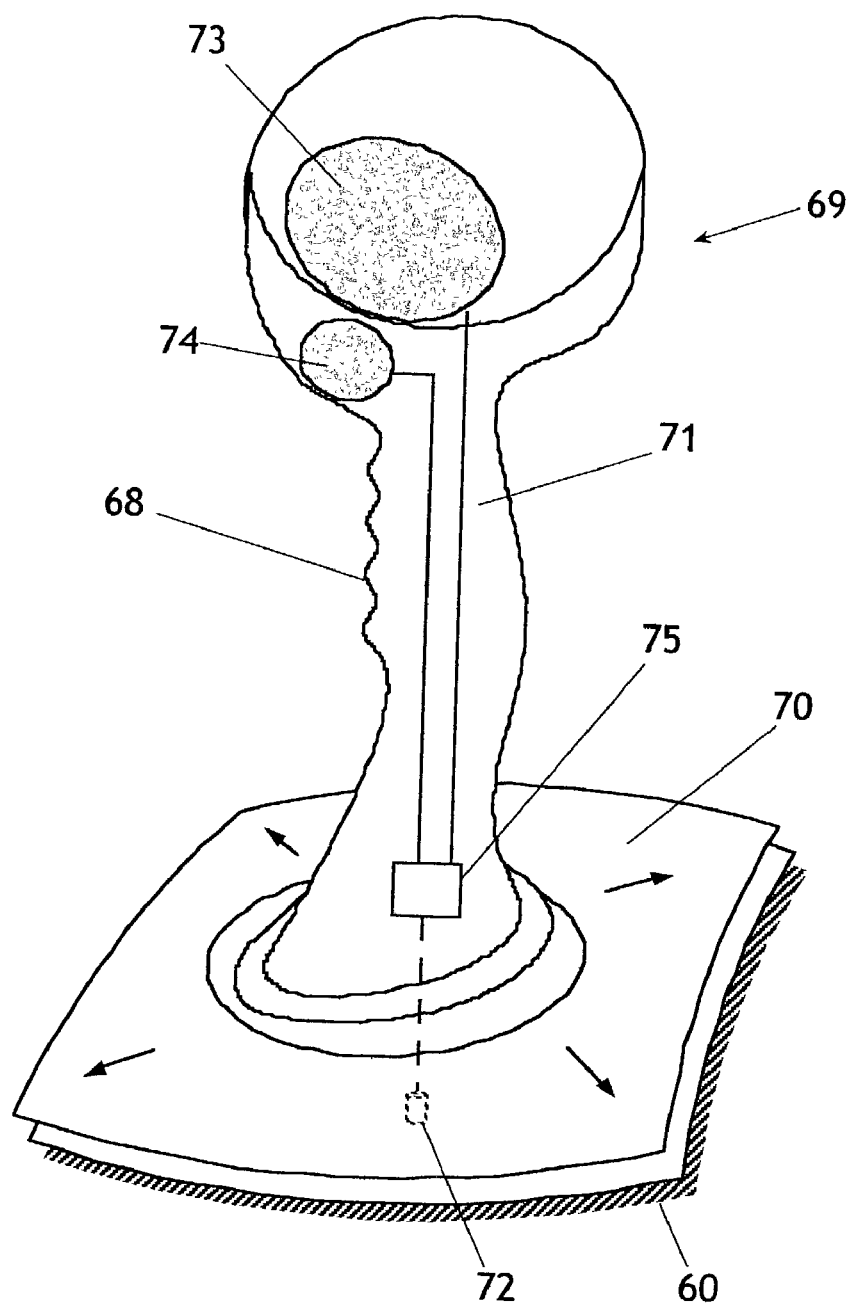
FIG. 18 is a perspective view of a joystick controller in accordance with the present invention.

With regard to FIGS. 18, a joystick controller 69 includes a base portion 70 from which a control wand 71 extends upwardly. The wand 71 is coupled to the active touch-stimulating tip 72 extending toward the screen layer 60, so that the screen assembly detects translation of the wand 71 by identifying the CDMA code and tracking the movement of the touch-stimulating tip 72 on the touch screen 60. The tip 72 movement corresponds to wand motion 71, whereby highly controllable input signals may be generated. The tip receives a CDMA signal from the code generator circuit 75. The joystick may operate in either joystick mode or mouse mode, in which event data is communicated from switch buttons 73 and 74 to the generator circuit 75 where a modulated code is generated.

Figure 19A:
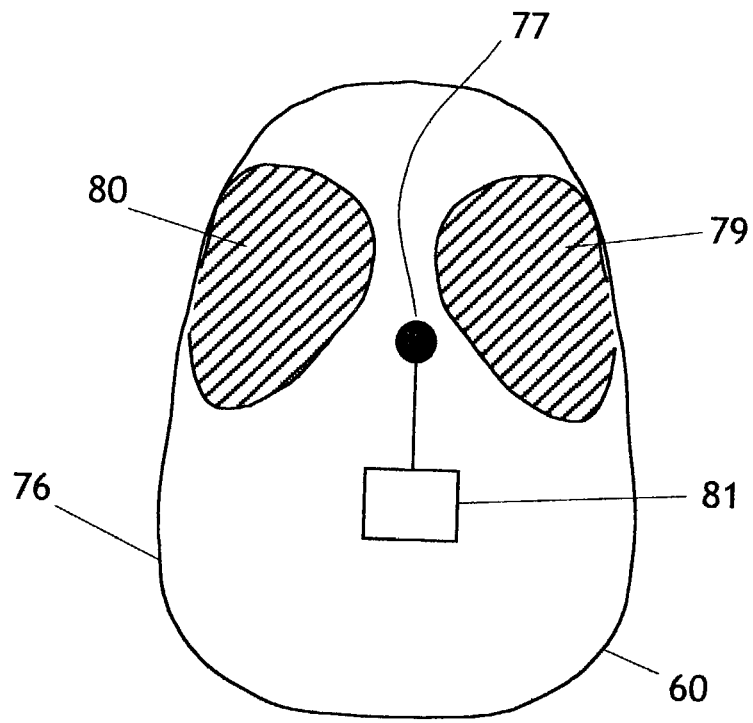
FIGS. 19A and 19B are a top view and a side elevation of a mouse controller in accordance with the present invention.
Figure 19B:
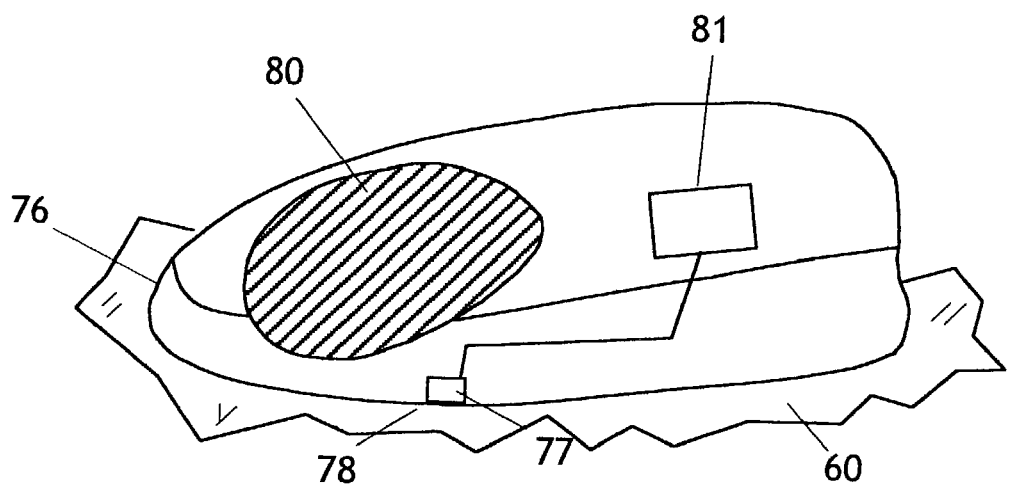

As shown in FIGS. 19A and 19B, a touch-input mouse 76 may have a single touch-stimulating point 77 to perform its function. This contact point 77 is a positioning point 78 and is fixed to the front or middle of the device and provides touch stimulation as a direct or capacitive contact. The contact point will touch-stimulate the sensing surface 60 with a CDMA code from circuit 81. The mouse 76 is equipped with the right button 79 and the left button 80, are designed as moveable buttons to yield the clicking status.

The various aspects of the invention described above regarding CDMA code generation and detection, EM field power and induced operating power, with or without coded transmission to the active devices, switch event modulation of code transmission, and the like, may be applied selectively or entirely to all the embodiments of FIGS. 15–19.

The foregoing description of the preferred embodiment of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A touch sensing system for identifying and locating one or more touch stimulating devices in a touch sensing area, including:

a signal propagating layer for conducting signals throughout said touch sensing area;

at least one of said touch stimulating devices including means for producing a touch excitation signal and coupling said signal to said propagating layer, said touch excitation signal comprising a spread spectrum signal;

each touch excitation signal including a unique code identifying the respective device;

signal pickup means connected to said propagating layer to receive at least one touch excitation signal from said one or more touch stimulating devices;

means for decoding said touch excitation signal to identify at least one of said touch stimulating devices;

means for determining the position of each of said one or more touch stimulating devices on said touch sensing area;

said at least one touch stimulating device including a user-operated switch, and said means for producing a touch excitation signal including means for encoding and transmitting the on-off state of said switch; and, said means for encoding and transmitting the on-off state of said switch including means for transmitting the complementary signal of said unique code of said at least one device.

2. The touch sensing system of claim 1, wherein said means for determining the position of each touch stimulating device includes received signal strength (RSS) means.

3. The touch sensing system of claim 1, wherein said spread spectrum signal comprises a direct sequence spread spectrum signal (DSSS).

4. The touch sensing system of claim 1, wherein said touch excitation signal is transmitted to said propagating layer at a frequency of at least 20 kHz.

5. A touch sensing system for identifying and locating one or more touch stimulating devices in a touch sensing area, including:
- a signal propagating layer for conducting signals throughout said touch sensing area;
- at least one of said touch stimulating devices including means for producing a touch excitation signal and coupling said signal to said propagating layer, said touch excitation signal comprising a spread spectrum signal;
- each touch excitation signal including a unique code identifying the respective device;
- signal pickup means connected to said propagating layer to receive at least one touch excitation signal from said one or more touch stimulating devices;
- means for decoding said touch excitation signal to identify at least one of said touch stimulating devices; and,
- means for determining the position of each of said one or more touch stimulating devices on said touch sensing area;
- wherein said means for decoding said touch excitation signal includes code reconstructor means for receiving pulse spikes of said touch excitation signal from said signal pickup means and restoring the signal structure of said touch excitation signal.

6. The touch sensing system of claim 5, wherein said code reconstructor means includes positive and negative channel means for receiving positive and negative pulse spikes respectively.

7. The touch sensing system of claim 6, wherein said code reconstructor means includes a charge reservoir, and said positive channel means includes means for detecting positive pulse spikes and increasing the voltage level of said charge reservoir in accordance with said positive pulse spikes.

8. The touch sensing system of claim 7, wherein said negative channel means includes means for detecting negative pulse spikes and decreasing the voltage level of said charge reservoir in accordance with said negative pulse spikes, whereby said voltage level of said charge reservoir represents said restored signal structure of said touch excitation signal.

9. A touch sensing system for identifying and locating one or more touch stimulating devices in a touch sensing area, including:
- a signal propagating layer for conducting signals throughout said touch sensing area;
- at least one of said touch stimulating devices including means for producing a touch excitation signal and coupling said signal to said propagating layer, said touch excitation signal comprising a spread spectrum signal;
- each touch excitation signal including a unique code identifying the respective device;
- signal pickup means connected to said propagating layer to receive at least one touch excitation signal from said one or more touch stimulating devices;
- means for decoding said touch excitation signal to identify at least one of said touch stimulating devices; and,
- means for determining the position of each of said one or more touch stimulating devices on said touch sensing area;
- wherein said at least one touch stimulating device includes a waveform generator and memory means connected to said waveform generator to store said unique code.

10. The touch sensing system of claim 9, wherein said unique code is stored as a plurality of CDMA chips in said memory means.

11. The touch sensing system of claim 10, further including clock means for fetching said CDMA chips in serial, stepwise fashion and transmitting said chips to said waveform generator.

12. The touch sensing system of claim 11, further including fixed delay chip means for applying a fixed time delay after said unique code is transmitted.

13. The touch sensing system of claim 12, further including means for transmitting a data signal from said means for decoding said touch excitation signal to said at least one device.

14. The touch sensing system of claim 13, wherein said data signal includes at least one bit, and said at least one device includes means for applying at least one additional delay chip to said waveform generator in response to receiving said at least one bit of said data signal.

15. A touch sensing system for identifying and locating one or more touch stimulating devices in a touch sensing area, including:
- a signal propagating layer for conducting signals throughout said touch sensing area;
- at least one of said touch stimulating devices including means for producing a touch excitation signal and coupling said signal to said propagating layer, said touch excitation signal comprising a spread spectrum signal;
- each touch excitation signal including a unique code identifying the respective device;
- signal pickup means connected to said propagating layer to receive at least one touch excitation signal from said one or more touch stimulating devices;
- means for decoding said touch excitation signal to identify at least one of said touch stimulating devices; and,
- means for determining the position of each of said one or more touch stimulating devices on said touch sensing area;
- said means for decoding said touch excitation signal including matched filter means for detecting said unique code of said at least one device;
- wherein said means for decoding said touch excitation signal includes memory means for storing the unique codes of said one or more touch stimulating devices and providing said codes to said matched filter means.

16. The touch sensing system of claim 15, further including means for transmitting operating power to said at least one touch stimulating device.

17. The touch sensing system of claim 16, wherein said means for transmitting operating power includes a field transmitting coil disposed adjacent to said signal propagating layer, and a pickup coil disposed in said at least one touch stimulating device.

18. The touch sensing system of claim 17, wherein said transmitting coil and said pickup coil are tuned to substantially the same frequency.

19. The touch sensing system of claim 17, further including means for transmitting a data signal from said transmitting coil to said pickup coil.

20. The touch sensing system of claim 19, wherein said means for transmitting a data signal includes means for supplying a power signal to said transmitting coil, and means for modulating said power signal with said data signal.

21. The touch sensing system of claim 20, wherein said at least one touch stimulating device includes means for demodulating said power signal to detect said data signal.

22. The touch sensing system of claim 16, wherein said means for transmitting operating power includes a field transmitting coil for transmitting a power signal, and antenna means for receiving said power signal and generating sufficient power to drive said means for producing a touch excitation signal.

23. The touch sensing system of claim 22, wherein said antenna means includes a ferrite antenna and an antenna coil extending about said ferrite antenna.

24. The touch sensing system of claim 23, further including a capacitor connected to said antenna coil to form a resonant LC antenna tuned to the frequency of said power signal.

25. The touch sensing system of claim 24, wherein said capacitor is assembled to one end of said ferrite antenna.

26. The touch sensing system of claim 25, further including a hole extending through said ferrite antenna to receive a wire connecting said capacitor and said antenna coil.

27. The touch sensing system of claim 23, wherein said ferrite antenna comprises a toroidal component having an inner annular chamber, and said antenna coil is disposed within said inner annular chamber.

28. The touch sensing system of claim 27, wherein said inner annular chamber extends about an axial portion of said toroidal component, and said antenna coil is wound about said axial portion.

29. The touch sensing system of claim 28, further including a bore extending axially through said axial portion.

30. The touch sensing system of claim 27, wherein said inner annular chamber is open at one end to an end surface of said toroidal component.

31. The touch sensing system of claim 15, wherein said matched filter means include a parallel transposed-form FIR matched-filter.

32. The touch sensing system of claim 15, wherein said at least one touch stimulating device comprises a joystick controller.

33. The touch sensing system of claim 15, wherein said at least one touch stimulating device comprises a mouse controller.

34. The touch sensing system of claim 15, wherein said at least one touch stimulating device comprises a knob controller.

35. The touch sensing system of claim 15, wherein said at least one touch stimulating device comprises a fader controller.

36. The touch sensing system of claim 15, wherein a field transmitting coil is disposed adjacent to the periphery of said signal propagating layer, and further including a secondary transmitting coil disposed generally within said field transmitting coil.

37. The touch sensing system of claim 36, wherein said field transmitting coil and said secondary transmitting coil are arranged to generate EM fields that have generally aligned vertical components.

38. The touch sensing system of claim 37, wherein said secondary transmitting coil is disposed to span a central null zone in the vertical component of the EM field of said field transmitting coil.

39. The touch sensing system of claim 38, further including a ferromagnetic antenna disposed concentrically within said secondary transmitting coil.

40. The touch sensing system of claim 39, wherein said ferromagnetic antenna comprises a generally flat, sheet-like component, and said secondary transmitting coil is generally coplanar with said ferromagnetic antenna.

41. The touch sensing system of claim 36, wherein said field transmitting coil and said secondary transmitting coil are connected in parallel to an EM signal source.

42. The touch sensing system of claim 36, wherein said secondary transmitting coil is disposed adjacent to a back surface of said signal propagating layer.

43. The touch sensing system of claim 36, wherein said signal propagating layer is disposed superjacently to a flat panel display, and said secondary transmitting coil is disposed adjacent to a back surface of said flat panel display.

44. The touch sensing system of claim 36, further including a ferromagnetic antenna disposed concentrically within said secondary transmitting coil.

45. The touch sensing system of claim 44, wherein said ferromagnetic antenna comprises a generally flat, sheet-like component, and said secondary transmitting coil is generally coplanar with said ferromagnetic antenna.

46. A touch sensing system for identifying and locating one or more touch stimulating devices in a touch sensing area, including:
 a signal propagating layer for conducting signals throughout said touch sensing area;
 at least one of said touch stimulating devices including means for producing a touch excitation signal and coupling said signal to said propagating layer, said touch excitation signal comprising a spread spectrum signal;
 each touch excitation signal including a unique code identifying the respective touch stimulating device;
 signal pickup means connected to said propagating layer to receive at least one touch excitation signal from said one or more touch stimulating devices;
 means for decoding said touch excitation signal to identify at least one of said touch stimulating devices; and,
 means for determining the position of each of said one or more touch stimulating devices on said touch sensing area;
 said means for decoding said touch excitation signal including matched filter means for detecting said unique code of said at least one device;
 further including signal normalization means for receiving the output of said matched filter means and normalizing the amplitude of said output.

47. The touch sensing system of claim 46, wherein said means for determining the position includes received signal strength means for receiving said output of said normalization means and calculating the position of said at least one device on said propagating layer.

48. A touch sensing system for identifying and locating one or more touch stimulating devices in a touch sensing area, including:
 a signal propagating layer for conducting signals throughout said touch sensing area;
 at least one of said touch stimulating devices including means for producing a touch excitation signal and coupling said signal to said propagating layer;
 means for determining the position of each of said one or more touch stimulating devices on said screen assembly;
 means for transmitting operating power to said at least one touch stimulating device, including a field transmitting coil disposed adjacent to said signal propagating layer and a secondary transmitting coil disposed at a back surface of said signal propagating layer, and a pickup coil disposed in said at least one touch stimulating device, said field coil and secondary coil transmitting a combined EM field at a resonant frequency to said pickup coil.

49. The touch sensing system of claim 48, wherein said field transmitting coil is disposed adjacent to the periphery of said signal propagating layer, and said secondary transmitting coil is disposed generally within said field transmitting coil.

50. The touch sensing system of claim 49, wherein said field transmitting coil and said secondary transmitting coil are arranged to generate EM fields that have generally aligned vertical components.

51. The touch sensing system of claim 49, wherein said field transmitting coil and said secondary transmitting coil are connected in parallel to an EM signal source.

52. The touch sensing system of claim 49, wherein said secondary transmitting coil is disposed adjacent to a back surface of said signal propagating layer.

53. The touch sensing system of claim 49, wherein said signal propagating layer is disposed superjacently to a flat panel display, and said secondary transmitting coil is disposed adjacent to a back surface of said flat panel display.

54. The touch sensing system of claim 49, wherein said secondary transmitting coil is disposed to span a central null zone in the vertical component of the EM field of said field transmitting coil.

55. The touch sensing system of claim 49, further including a ferromagnetic antenna disposed concentrically within said secondary transmitting coil.

56. The touch sensing system of claim 55, wherein said ferromagnetic antenna comprises a generally flat, sheet-like component, and said secondary transmitting coil is generally coplanar with said ferromagnetic antenna.

57. A touch sensing system for identifying and locating one or more touch stimulating devices in a touch sensing area, including:
   a signal propagating layer for conducting signals throughout said touch sensing area;
   at least one of said touch stimulating devices including means for producing a touch excitation signal and coupling said signal to said propagating layer;
   each touch excitation signal including a unique code identifying the respective device;
   signal pickup means connected to said propagating layer to receive at least one touch excitation signal from said one or more touch stimulating devices;
   means for decoding said touch excitation signal to identify at least one of said touch stimulating devices;
   means for determining the position of each of said one or more touch stimulating devices on said screen assembly;
   means for transmitting operating power to said at least one touch stimulating device, including a field transmitting coil for transmitting a power signal, and antenna means for receiving said power signal and generating sufficient power to drive said means for producing a touch excitation signal;
   said antenna means including a ferrite antenna and an antenna coil extending about said ferrite antenna.

58. The touch sensing system of claim 57, further including a capacitor connected to said antenna coil to form a resonant LC antenna tuned to the frequency of said power signal.

* * * * *